US008213057B2

(12) United States Patent
Kabashima

(10) Patent No.: US 8,213,057 B2
(45) Date of Patent: Jul. 3, 2012

(54) IMAGE FORMING APPARATUS AND CONTROL METHOD THEREOF

(75) Inventor: Toru Kabashima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1063 days.

(21) Appl. No.: 12/128,398

(22) Filed: May 28, 2008

(65) Prior Publication Data

US 2008/0298868 A1 Dec. 4, 2008

(30) Foreign Application Priority Data

May 31, 2007 (JP) ................................. 2007-146095

(51) Int. Cl.
*G06T 5/00* (2006.01)
*H04N 1/409* (2006.01)

(52) U.S. Cl. .......................... 358/3.27; 358/1.1; 358/1.9

(58) Field of Classification Search ................... 358/1.1, 358/1.2, 1.9, 3.27, 3.28, 1.18, 406, 296; 399/38, 399/49
See application file for complete search history.

(56) References Cited

U.S. PATENT DOCUMENTS

| | | | | |
|---|---|---|---|---|
| 5,856,876 | A * | 1/1999 | Sasanuma et al. | 358/300 |
| 5,978,615 | A * | 11/1999 | Tanaka et al. | 399/49 |
| 2003/0160985 | A1* | 8/2003 | Bailey | 358/1.9 |

FOREIGN PATENT DOCUMENTS

| | | | |
|---|---|---|---|
| JP | 03-233576 | | 10/1991 |
| JP | 2004-289873 | A | 10/2004 |
| JP | 2004-342039 | | 12/2004 |
| JP | 2004-342049 | | 12/2004 |
| JP | 2005-249873 | | 9/2005 |

OTHER PUBLICATIONS

Japanese Office Action dated Jan. 20, 2012, in counterpart Japanese Application No. 2007-146095.

English-language translation of Japanese Office Action dated Jan. 20, 2012, in counterpart Japanese Application No. 2007-146095.

* cited by examiner

*Primary Examiner* — Thomas D Lee

(74) *Attorney, Agent, or Firm* — Fitzpatrick, Cella, Harper & Scinto

(57) ABSTRACT

An image forming apparatus improves precision in adjudicating the type of the recording medium while also minimizing the time required to make such an adjudication. To accomplish this, the apparatus includes a storage unit that stores a plurality of types of particular shape images that configures a two-dimensional bar code. The apparatus forms a measurement pattern image for measurement, which includes one or more of the particular shape images, upon an image carrier and reads in the measurement pattern image that is formed upon the image carrier. The apparatus then determines a difference between a shape of the particular shape image that is included in the measurement pattern image and a shape of the particular shape image that is stored in the storage unit and subsequently determines an image forming condition with regard to the particular shape image stored in the storage unit.

12 Claims, 16 Drawing Sheets

FIG. 7
| | S PATCH | | | | COMPARISON WITH CONVENTIONAL PATCH | |
|---|---|---|---|---|---|---|
| | A | B | C | D | SCREENING | ERROR DIFFUSION |
| |  |  |  |  | 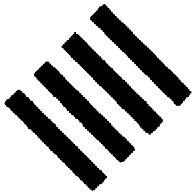 | 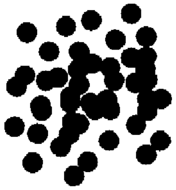 |
| VERTICAL | 2 | 3 | 4 | 6 | 1~2 | 0 |
| HORIZONTAL | 2 | 3 | 4 | 6 | 1~2 | 0 |
| INTERIOR CORNER | 0 | 1 | 2 | 4 | 0 | 0 |
| EXTERIOR CORNER | 4 | 5 | 6 | 8 | 0 | 0 |

FIG. 11
| | A | A-2 | B | B-2 | B-3 | B-4 | C | D |
|---|---|---|---|---|---|---|---|---|
| |  |  |  |  |  |  |  |  |
| VERTICAL | 2 | 4 | 4 | 4 | 4 | 4 | 4 | 6 |
| HORIZONTAL | 4 | 2 | 4 | 4 | 4 | 4 | 6 | 6 |
| UPPER LEFT HAND | 0 | 0 | 1 | 0 | 0 | 0 | 1 | 1 |
| UPPER RIGHT HAND | 0 | 0 | 0 | 1 | 0 | 0 | 1 | 1 |
| LOWER RIGHT HAND | 0 | 0 | 0 | 0 | 1 | 0 | 0 | 1 |
| LOWER LEFT HAND | 0 | 0 | 0 | 0 | 0 | 1 | 0 | 1 |
| EXTERIOR CORNER | 4 | 4 | 5 | 5 | 5 | 5 | 6 | 8 |
| PIXEL | 2 | 2 | 3 | 3 | 3 | 3 | 4 | 5 |
| PATCH QUANTITY | 30 | 30 | 20 | 20 | 20 | 20 | 15 | 12 |
| AREA | 200 | 200 | 300 | 300 | 300 | 300 | 400 | 500 |
| TOTAL | 6000 | 6000 | 6000 | 6000 | 6000 | 6000 | 6000 | 6000 |

FIG. 14

| | | TEST TRIAL 1-1 | TEST TRIAL 1-2 | TEST TRIAL 1-3 | TEST TRIAL 1-4 |
|---|---|---|---|---|---|
| CROSS | D | 31500 | 29400 | 29400 | 32200 |
| CONVEX PROTRUSION | C | 31500 | 29700 | 29250 | 32400 |
| UPPER LEFT HAND | B | 31500 | 29610 | 29610 | 32760 |
| HORIZONTAL | A | 31500 | 30240 | 28980 | 31500 |
| VERTICAL | A-2 | 31500 | 28980 | 30240 | 31500 |

FIG. 15

| | CORRECTION | | | RESULT | |
|---|---|---|---|---|---|
| | LOCATION | SIZE | SHAPE | PATTERN MATCHING PRECISION | TIME REQUIRED FOR ANALYSIS |
| CONVENTIONAL INSTANCE | | | | 85~100 | 60.2 |
| TEST TRIAL 1-5 | WRITING OUT LOCATION | | | 80 | 37.6 |
| TEST TRIAL 1-6 | WRITING OUT LOCATION | THICKENING PROCESS | | 85 | 41.6 |
| TEST TRIAL 1-7 | WRITING OUT LOCATION | THICKENING PROCESS | THICKENING, THINNING PROCESS | 89 | 56.1 |

FIG. 16

| | CORRECTION | | | RESULT | |
|---|---|---|---|---|---|
| | LOCATION | SIZE | SHAPE | PATTERN MATCHING PRECISION | TIME REQUIRED FOR ANALYSIS |
| CONVENTIONAL INSTANCE | | | | 85~100 | 60.2 |
| TEST TRIAL 2-1 | WRITING OUT LOCATION | | | 90 | 60.6 |
| TEST TRIAL 2-2 | WRITING OUT LOCATION | THICKENING PROCESS | | 92 | 65.1 |
| TEST TRIAL 2-3 | WRITING OUT LOCATION | THICKENING PROCESS | THICKENING, THINNING PROCESS | 95 | 72.1 |

FIG. 18

| | LOCATION | AREA | SHAPE | SCATTERING | STANDARD DEVIATION | ASPECT RATIO | PATTERN MATCHING PRECISION | TIME REQUIRED FOR ANALYSIS |
|---|---|---|---|---|---|---|---|---|
| CONVENTIONAL INSTANCE | | | | | | | 85~100 | 60.2 |
| TEST TRIAL 2-1 | WRITING OUT LOCATION | | | | | | 90 | 60.6 |
| TEST TRIAL 3-1 | WRITING OUT LOCATION | THICKENING PROCESS | THICKENING, THINNING PROCESS | THINNING PROCESS | | | 97 | 69.7 |
| TEST TRIAL 3-2 | WRITING OUT LOCATION | THICKENING PROCESS | THICKENING, THINNING PROCESS | THINNING PROCESS | THICKENING, THINNING PROCESS | | 98 | 74.9 |
| TEST TRIAL 3-3 | WRITING OUT LOCATION | THICKENING PROCESS | THICKENING, THINNING PROCESS | THINNING PROCESS | THICKENING, THINNING PROCESS | THICKENING, THINNING PROCESS | 99 | 82.9 |

FIG. 19

| | LOCATION | AREA | SHAPE | SCATTERING | STANDARD DEVIATION | ASPECT RATIO | PATTERN MATCHING PRECISION | TIME REQUIRED FOR ANALYSIS |
|---|---|---|---|---|---|---|---|---|
| CONVENTIONAL INSTANCE | | | | | | | 85~100 | 60.2 |
| TEST TRIAL 3-1 | WRITING OUT LOCATION | | | | | | 90 | 69.7 |
| TEST TRIAL 4-1 | WRITING OUT LOCATION | THICKENING PROCESS | THICKENING, THINNING PROCESS | THINNING PROCESS | | | 97 | 34.8 |
| TEST TRIAL 4-2 | WRITING OUT LOCATION | THICKENING PROCESS | THICKENING, THINNING PROCESS | THINNING PROCESS | THICKENING, THINNING PROCESS | | 98 | 37.4 |
| TEST TRIAL 4-3 | WRITING OUT LOCATION | THICKENING PROCESS | THICKENING, THINNING PROCESS | THINNING PROCESS | THICKENING, THINNING PROCESS | THICKENING, THINNING PROCESS | 99 | 41.5 |

IMAGE FORMING APPARATUS AND CONTROL METHOD THEREOF

BACKGROUND OF THE INVENTION

1. Field of the Invention

The present invention relates to an image forming apparatus that forms an image with a high resolution and a high degree of dot reproducibility, and a control method of the image forming apparatus thereof.

2. Description of the Related Art

In recent times, a wide range of demands have been made with regard to an image forming apparatus, such as a copying machine or a printer. The demands include a restriction on copying or forming of an image of a original document that includes a two-dimensional bar code image, such as a QR Code (a registered trademark of Denso Wave Incorporated). Forming a two-dimensional bar code, which contains a large volume of information within an area of a limited size, requires forming the image with a high precision that achieves both a very high resolution and a high dot reproducibility.

Japanese Patent Laid Open No. 2005-249873 illustrates an image forming apparatus that measures the density of a developing material image that is formed upon a photosensitive drum, and detects a degradation in a tone or a developer solution thereof. Japanese Patent Laid Open No. 2004-342039 illustrates an information recording medium that installs a function that is capable of recovering the QR code even if a portion of the QR Code is lacking, and that facilitates reading the QR Code even if a reproducibility of the lacking portion thereof is poor. Japanese Patent Laid Open No. H03-233576 illustrates an image forming apparatus that compares information that is read from a original document that is stored upon a storage apparatus with information that is read from an outputted object, and adjusts a parameter that is used in forming an image in order that the respective information matches. As described herein, a wide range of methods are proposed for achieving the forming of the image with a high precision with respect to the image forming apparatus.

With respect to the image forming apparatus and the information recording medium described as per the foregoing, however, a number of problems exist, as will be described hereinafter. As an instance, the image forming apparatus disclosed according to Japanese Patent Laid Open No. 2005-249873 places an emphasis upon the detection of the density of the image that is formed, in order to adjust a parameter with regard to the formation of the image thereby. A problem arises therewith, however, in that the reproducibility of a bend portion of a dot or the precision in the detection of an edge effect, which constitute a most important aspect with regard to forming the image of the two-dimensional bar code, is low. It is to be understood that the bend portion of the dot refers to a portion that constitutes a 90 degree shape with a pixel and another pixel that configures the two-dimensional bar code. The edge effect refers to toner largely adhering to an edge portion of a line shaped image. With regard to the information recording medium disclosed according to Japanese Patent Laid Open No. 2004-342039, which involves adding the information in order to recover data in a region of a portion of the QR Code that is encrypted, a problem that arises, as a consequence, is that the volume of information that is available to be encoded is reduced, and it becomes impossible to encrypt a volume of information that will satisfy a user. With regard to the image forming apparatus disclosed according to Japanese Patent Laid Open No. H03-233576, which involves copying an original document image to a recording material and reading therefrom, a problem arises in that a processing thereof takes time and consumes the recording material. A further problem that arises is that the user is required to take time and trouble in moving the recording medium whereupon the original document image is copied to an apparatus that reads in the data thereupon. When reading what has been copied from the original document image, a deterioration in the dot reproducibility, such as a durability thereof, leads to an inability to accurately ascertain a property of the image forming apparatus that performed the copying. When reading what has been copied from the original document image, a reading property of the apparatus that reads in the data may have an effect upon the image information that is read thereby, thus causing a deterioration in the precision of ascertaining the property of the image forming apparatus proper.

SUMMARY OF THE INVENTION

The present invention provides an image forming apparatus that forms an image with a particular shape that configures an image, such as a two-dimensional bar code, with a high degree of precision.

One aspect of the present invention provides an image forming apparatus for forming a two-dimensional bar code, the image forming apparatus comprising a storage unit configured to store a plurality of types of particular shape images, each of the particular shape images configuring the two-dimensional bar code; an image forming unit configured to form a measurement pattern image for measurement, which includes one or more of the particular shape images, upon an image carrier, as a developing material image; a pattern reading unit configured to read the measurement pattern image that is formed upon the image carrier; a first determination unit configured to determine the difference between a shape of the particular shape image that is included in the measurement pattern image that is read with the pattern reading unit, and a shape of the particular shape image that is stored in the storage unit; and a second determination unit configured to determine an image forming condition with regard to the particular shape image stored in the storage unit, in accordance with the difference that is determined by the first determination unit.

Another aspect of the present invention provides a control method of an image forming apparatus for forming a two-dimensional bar code, the control method comprising the steps of: storing a plurality of types of particular shape images, each of the particular shape images configuring the two-dimensional bar code, in a storage unit; forming a measurement pattern image for measurement, which includes one or more of the particular shape images, upon an image carrier, as a developing material image; reading the measurement pattern image that is formed upon the image carrier; determining the difference between a shape of the particular shape image that is included in the measurement pattern image that is read in the pattern reading step, and a shape of the particular shape image that is stored in the storage unit; and determining an image forming condition with regard to the particular shape image stored in the storage unit, in accordance with the difference that is determined in the first determination step.

Further features of the present invention will be apparent from the following description of exemplary embodiments, with reference to the attached drawings.

BRIEF DESCRIPTION OF THE DRAWINGS

FIG. 7 illustrates a plurality of the patch images according to the first embodiment.

FIG. 11 illustrates a plurality of types of the patch images.

FIG. 14 illustrates a result when an adjustment process is executed according to the first embodiment.

FIG. 15 illustrates a method of adjusting the difference of the image according to the first embodiment.

FIG. 16 illustrates a result when an adjustment process is executed with regard to an image forming apparatus according to a second embodiment.

FIG. 18 illustrates a result when an adjustment process is executed with regard to an image forming apparatus according to a third embodiment.

FIG. 19 illustrates a result when an adjustment process is executed with regard to an image forming apparatus according to a fourth embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention, except where specifically stated otherwise.

The present invention performs an adjustment process that improves the precision of a forming of an image by, for instance, employing a plurality of types of an image with a particular shape (hereinafter collectively referred to as a "patch image") that includes a particular shape that configures a two-dimensional bar code, for instance, a QR Code, in order to form an image with a high degree of precision that renders the two-dimensional bar code. The adjustment process forms a pattern image for a measurement that includes one or more of the patch image of a single type (hereinafter referred to as "patch pattern") upon a photosensitive drum that is an image carrier, and reads in the patch pattern that is formed upon the photosensitive drum. The adjustment process employs the patch pattern thus read, and image data that is employed in the forming of the image, to determine the difference from a logical value with respect to a shape, a location, and an area of the patch pattern. The adjustment process further corrects the image data in order to form the two-dimensional bar code from an information of the difference thus determined. It is thus possible for the image forming apparatus according to the present invention to form, with a high degree of precision, even a two-dimensional bar code that is configured from an image with a particular shape.

[First Embodiment]

Following is a description according to a first embodiment, with reference to the attached drawings FIG. 1 to FIG. 15. In the present circumstance, a description will be disclosed only with regard to a primary element according to the present invention.

<Image Forming Apparatus>

Figure 1:
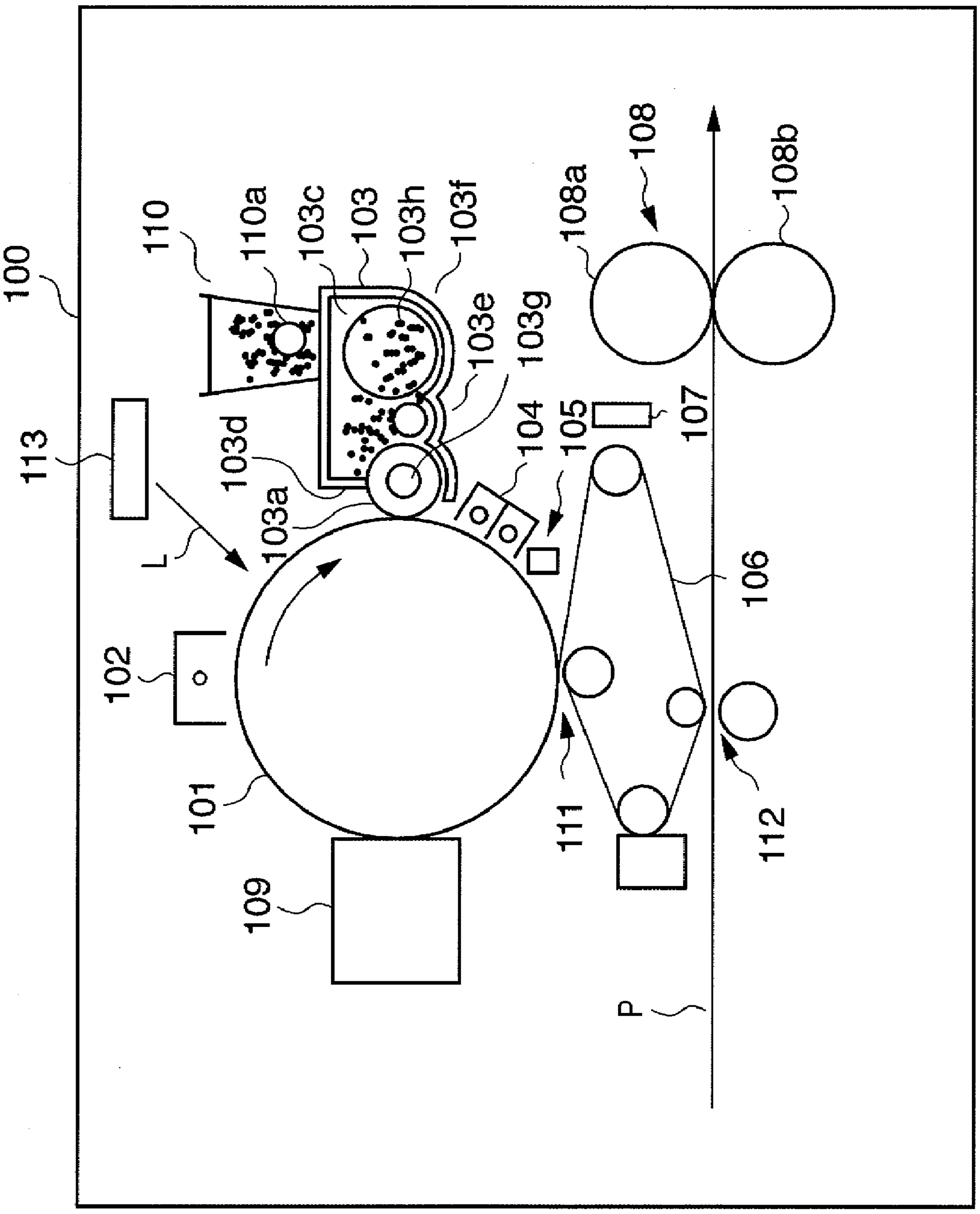
FIG. 1 is a cutaway diagram that illustrates a portion of an image forming apparatus according to a first embodiment.

FIG. 1 is a cutaway diagram that illustrates a portion of an image forming apparatus according to the first embodiment. In the present circumstance, a description will be disclosed primarily with regard to a component according to the present invention as concerns an image forming apparatus 100.

The image forming apparatus 100 incorporates a photosensitive drum 101 that is an image carrier, a first charger 102, a developing device 103 that is a developing material carrier, a toner supply vessel 110, a charger prior to an image transference 104, a cleaning device 109 and an exposure device 113 as an exposure unit. The image forming apparatus 100 further includes density detection sensors 105 and 107, an intermediate transference belt 106 that is an intermediate transference medium, and a fixing unit 108. Each respective device is driven as an image forming unit when forming the image upon a recording material.

The photosensitive drum 101 is rotated in a direction of an arrow that is illustrated in FIG. 1, i.e., in a clockwise direction, and at a prescribed speed of rotation, for instance, 450 mm per second. When forming the image, an electrostatic latent image is first formed upon the photosensitive drum 101 by the exposure device 113. Thereafter, the electrostatic latent image is developed by the developing device 103. A first transfer of a toner image, i.e., a developer solution image, which is thus developed, is made at an image transfer location 111 to the intermediate transference belt 106. The first charger 102 applies an electric potential to a surface of the photosensitive drum 101 when forming the electrostatic latent image thereupon. As an instance, the first charger 102 charges the surface of the photosensitive drum 101 to +500 volts. Thereafter, the exposure device 113 forms an electrostatic latent image upon the surface of the photosensitive drum 101 by exposing the drum 101 to light modulated according to data of the image to be formed, i.e., an image signal. It is to be understood that the exposure device 113 exposes the drum to light at a resolution of 1200 dpi, for example. The developing device 103 uses toner to develop the electrostatic latent image that is formed upon the photosensitive drum 101. The image forming apparatus 100 according to this embodiment employs a method of developing that is referred to as a jumping developing technique. A detailed description of the developing device 103 and the developing of the electrostatic latent image will follow hereinafter, with reference to FIG. 2 and FIG. 3.

The charger prior to the image transference 104 applies an electrical charge to a surface of a toner image that is formed upon the photosensitive drum 101. As a result, the force with which the toner is attracted to the intermediate transference belt 106 at the image transfer location 111, is strengthened. Put another way, it is thus easier to separate the toner image from the photosensitive drum 101. Thereafter, the first transfer of the toner image that is formed upon the photosensitive drum 101 to the intermediate transference belt 106 is made with the image transfer location 111. After the toner image is transferred to the intermediate transference belt 106, the cleaning device 109 removes and reclaims excess toner that remains upon the surface of the photosensitive drum 101.

A second transfer of the toner image that is transferred to the intermediate transference belt 106 to a recording material P is made at an image transfer location 112. The recording material P is conveyed to the image transfer location 112 in accordance with the timing of the second transfer of the toner image. The recording material P is conveyed, upon the transfer of the toner image thereupon, to the fixing unit 108. The fixing unit 108 fixes the toner image that is transferred to the recording material P upon the recording material P. The fixing unit 108 thermally fixes the toner image by applying heat and pressure to the toner image in a fixing nipper unit that is between a fixing roller 108*a* and a pressure roller 108*b*, and outputs the result thereof outside of the apparatus thereafter.

The toner supply vessel 110 is installed upon an upper part of the developing device 103, and supplies a toner 103*h* that is stored in the toner supply vessel 110 to the developing device 103. The toner supply vessel 110 includes a roller 110*a* wherein is included a magnet (hereinafter "magnet roller"), for supplying the toner 103*h* to the developing device 103. When a toner amount detection sensor detects that the amount of a toner that is stored within a developing vessel 103*c* falls below a prescribed amount thereof at a time when a developing operation is taking place, the magnet roller 110*a* rotates and supplies the toner 103*h* that is stored within the toner supply vessel 110 to the developing device 103. Specifically, the toner 103*h* that is stored within the toner supply vessel 110 is attracted to a surface of the magnet roller 110*a*. The magnet roller 110*a* then rotates, and causes a given amount of the toner 103*h* that is retained upon the surface of the magnet roller 110*a* to descend into the developing vessel 103*c*. The toner 103*h* is thereby supplied to the developing device 103.

The toner 103*h* that is employed according to the embodiment, i.e., a magnetic single component toner, is a negative toner that has a weight-average grain size of between 5.0 and 9.0 μm. The toner 103*h* further includes at least one of a styrene acrylate resin and a polyester resin. The toner 103*h* also includes between 0.2 percent and 4.0 percent by weight of $SiO_2$ as an outer layer thereof.

The density detection sensor 105 is positioned in an immediate vicinity of the photosensitive drum 101, and is employed to detect the density of the toner image that is formed upon the photosensitive drum 101. A description with regard to a specific method of detecting the density thereof will be provided hereinafter, with reference to FIG. 10. The density detection sensor 107 is configured in a manner similar to the configuration of the density detection sensor 105, and is positioned in an immediate vicinity of the intermediate transference belt 106, and is employed to detect the density of the toner image that is transferred to the intermediate transference belt 106. The density detection sensors 105 and 107 are employed to read a patch pattern, i.e., a toner patch, which is formed upon the photosensitive drum 101 and the intermediate transference belt 106, and is used in an adjustment process. A detailed description with regard to the patch pattern will be provided hereinafter. It would be permissible for at least one of the density detection sensor 105 and 107 to be positioned in order to perform the adjustment process. It is to be understood that the adjustment process is performed by employing the density detection sensor 105 according to the embodiment.

Figure 2:
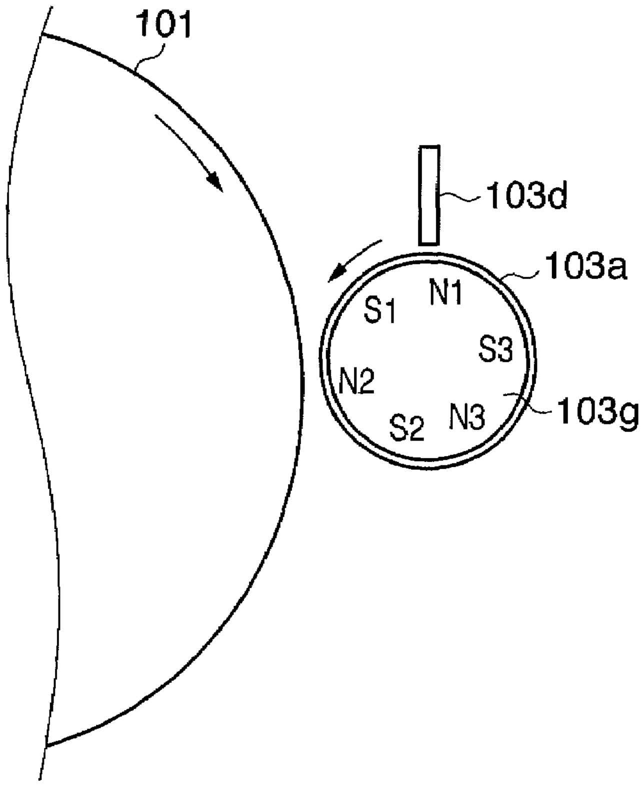
FIG. 2 is an enlarged view of a photosensitive drum and a development device according to the first embodiment.
Figure 3:
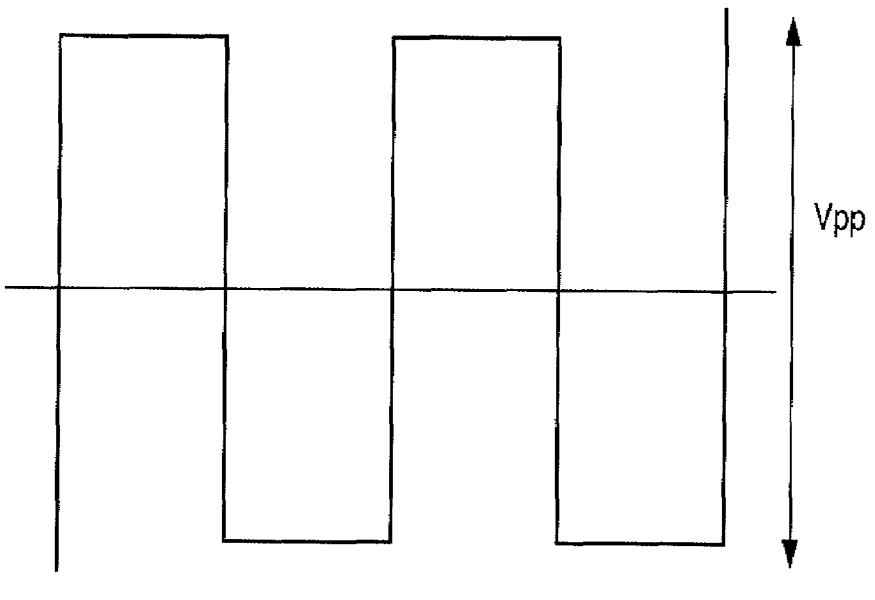
FIG. 3 illustrates an alternating current bias that is contained in a development bias.

The following is a description with regard to the developing device 103 and the method of developing the electrostatic latent image, with reference to FIG. 2 and FIG. 3. FIG. 2 shows an enlargement of the photosensitive drum and the development device according to the first embodiment. FIG. 3 illustrates an alternating bias that is contained in a development bias.

The developing device 103 includes a developing material carrier 103*a*, the developing vessel 103*c*, a layer thickness regulating blade 103*d*, toner agitation components 103*e* and 103*f*, an anchored magnet roll 103*g*, and the toner 103*h*. The developing material carrier 103*a* is positioned, such as is illustrated in FIG. 2, so as to be in an opposition to the photosensitive drum 101 with respect to an aperture unit of the developing vessel 103*c*, and so as to rotate freely in a direction as indicated by an arrow therein. Not shown is that a plurality of the developing material carriers 103*a* are positioned in a line with a direction of a rotation of the photosensitive drum 101. The developing material carrier 103*a* rotates at a speed that is between 100 percent and 200 percent of a rotation speed of the photosensitive drum 101. The interval between the developing material carrier 103*a* and the photosensitive drum 101 at a developing location is between 100 and 400 μm.

The developing vessel 103*c* contains the toner 103*h* therein. The toner agitation components 103*e* and 103*f* agitate the toner 103*h* that is contained in the developing vessel 103*c*, and conveys the toner 103*h* to each respective developing material carrier 103*a* thereafter. The developing device 103 includes the toner amount detection sensor (not shown), which detects the amount of the toner that is contained in the developing vessel 103*c*. The anchored magnet roll 103*g* is anchored in position with each respective developing material carrier 103*a*. Each respective magnetic pole (N1, N2, N3, S1, S2, S3) that includes a magnetic field pattern is positioned in the anchored magnet roll 103*g*. The layer thickness regulating blade 103*d* regulates the thickness of a coat of the toner 103*h*, which is retained upon the developing material carrier 103*a* by a magnetic force of the anchored magnet roll 103*g*.

When the electrostatic latent image is formed upon the photosensitive drum 101, a development bias, which is a superposition of a direct current bias and an alternating current bias, of a positive 300 volts, is first applied to the developing material carrier 103*a* from a development bias power source. In the present circumstance, the development bias that is applied thereto is of an identical polarity to a charge polarity of a developing site of the electrostatic latent image that is formed upon the photosensitive drum 101. The developing device 103 charges the toner 103*h* with an opposite polarity to the charge polarity of the photosensitive drum 101, and causes the toner 103*h* thus charged to adhere to the developing material carrier 103*a*. The toner 103*h* thereby flies toward the photosensitive drum 101 and causes the electrostatic latent image to develop. Such a method is referred to as the jumping developing technique. It is to be understood that the alternating current bias according to the embodiment denotes a square wave with a peak to peak voltage (Vpp) which is between 900 and 2000 volts, and with a frequency of between 1.0 and 4.0 kHz, such as is illustrated in FIG. 3. Whereas the square wave is employed according to the embodiment, however, it would be permissible to use a waveform with a shape that corresponds to such as a type of the toner, the photosensitive drum, or a format of the latent image.

<Control of Image Forming Apparatus>

Figure 4:
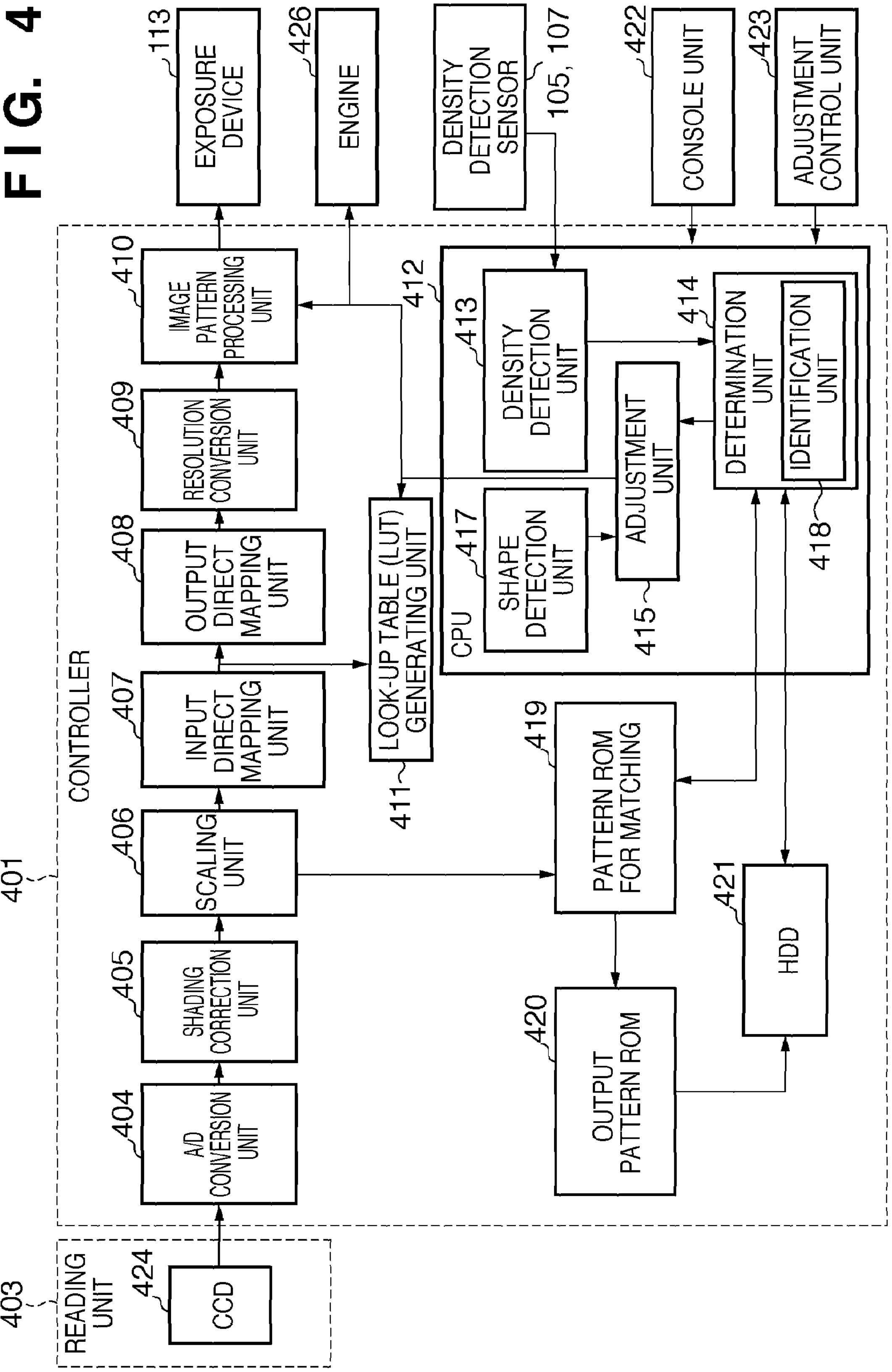
FIG. 4 illustrates a control block of the image forming apparatus according to the first embodiment.

The following is a description of a control of the image forming apparatus 100, with reference to FIG. 4. FIG. 4 illustrates a control block of the image forming apparatus according to the first embodiment. It is to be understood that only the description with regard to the control block according to the present invention is disclosed herein. Put another way, it would be permissible for the image forming apparatus 100 to incorporate a control block that differs from the control block that is described hereinafter.

The image forming apparatus 100 includes a controller 401 and a reading unit 403 that reads in a original document. The reading unit 403 applies light to a surface of the original document, uses a CCD 424 to receive a quantity of a light that is reflected from the original document, and outputs a respective signal for each of RGB (red, blue, green). As an instance, according to the embodiment, it would be permissible for the reading unit 403 to function as a bar code reading unit, and to read the two-dimensional bar code that is formed upon the recording material prior to forming the patch pattern, in order to execute the adjustment process. The controller 401 primarily generates image data for forming the image. Consequently, the controller 401 includes an A/D conversion unit 404, a shading correction unit 405, a scaling unit 406, an input direct mapping unit 407, an output direct mapping unit 408, a resolution conversion unit 409, and an image pattern processing unit 410. The controller 401 further includes a look-up table (LUT) generating unit 411, a CPU 412, a pattern ROM for matching 419, an output pattern ROM 420, and a hard drive 421. The controller 401 generates the image data in accordance with an information that is sent from either the reading unit 403, or a personal computer (PC) that is connected externally to the image forming apparatus 100, in order to generate the image data. The exposure device 113, an engine 426, and the density detection sensors 105 and 107 are connected to the controller 401. A console unit 422 and an adjustment control unit 423 is further connected to the controller 401. The engine 426 drives a portion of the image forming unit such as the developing vessel 103*c* and the photosensitive drum 101. The console unit 422 is employed when instructing execution of the adjustment process, and employs an input by an operator of an image forming condition, or a patch image, thereupon. The adjustment control unit 423 causes the adjustment process to be executed at either a predetermined time or a predetermined timing. A description with regard to the adjustment control unit 423 will be provided hereinafter according to a fourth embodiment.

The A/D conversion unit 404 performs a digitization process of the light quantity data that is sent from the reading unit 403 in an analog state. The shading correction unit 405 performs a shading correction of the data that is digitally converted by the A/D conversion unit 404, in order to determine a difference with a texture, or put another way, a blank background portion, of the original document. A resolution of the image that is read with the reading unit 403 is determined by a quantity of pixels of the CCD 424. The scaling unit 406 adjusts the post shading correction data with a magnification of a forward scan and a reverse scan of the original document. The scaling unit 406 thereafter outputs data that is scaled to a signal transmission route for carrying out the forming of the image and a signal transmission route for carrying out pattern matching.

The following is a description that commences with a description of the signal transmission route for carrying out the forming of the image. The input direct mapping unit 407, the output direct mapping unit 408, and the resolution conversion unit 409 convert the RGB signal value to each respective signal of a YMCK (Yellow, Magenta, Cyan, Black), and determine a resolution of an image to be outputted. If the image information that is formed is sent from the personal computer (PC) rather than from the reading unit 403, the image information is directed to the input direct mapping unit 407 if the image information is the RGB signal, or to the output direct mapping unit 408 if the image information is the YMCK signal. Upon the determination of the resolution, the image pattern processing unit 410, acting as a correction unit, carries out a screening process and an error diffusion process, thereby correcting the image data that is outputted to the exposure device 113. According to the embodiment, it is presumed that the reading of the image with the reading unit 403 is eight bits per pixel, and the forming of the image is in a binary output format, with two bits per pixel. The exposure device 113 forms the latent image upon a surface of the image carrier according to the image data that has been converted to the binary format. A description with regard to the electrostatic latent image thus formed will be provided hereinafter, with reference to FIG. 5.

The look-up table (LUT) generating unit 411 generates a look-up table (LUT) that is based upon the image information that is inputted via the input direct mapping unit 407. A look-up table (LUT) is a table that corrects the tone of the image that is formed. Specifically, the LUT is employed to correct data of a digitized brightness tone to a preset arbitrary corresponding tone. The pattern ROM for matching 419, which serves as a storage unit, stores the plurality of types of the patch image data that include the particular shape that configures the two-dimensional bar code. The pattern ROM for matching 419 also stores information of the two-dimensional bar code that is read via the reading unit 403. A patch pattern that is formed into the image is outputted from the pattern ROM for matching 419 to the output pattern ROM 420. It is to be understood that the patch pattern thus formed is outputted from the output pattern ROM 420 to the image pattern processing unit 410, via the hard drive 421 and the CPU 412. Loading data of a frequently used patch pattern onto the hard drive 421 allows the increasing of the speed of the formation of the patch pattern thereof.

The following is a description with regard to the CPU 412. The CPU 412 executes the adjustment process, employing the patch pattern that is crucial according to the present invention. As a consequence, the image forming apparatus 100 according to the embodiment outputs the two-dimensional bar code, such as the QR Code, in a stable manner. By executing the adjustment process, the image forming apparatus 100 ameliorates the difference between an actually formed image and an image of the original document, as will be described hereinafter.

A difference frequently arises in the image that is formed by the image forming apparatus 100 with respect to the image of the original document. A difference is present in the image that is formed thereby from the image of the original document as seen from either a macro- or a micro-viewpoint. A macro difference is a difference in a location of the formation of the image upon a sheet of recording paper, for instance, an error in the size of a white space that is formed in such as a leading edge, a trailing edge, a left hand edge, or a right hand edge. The macro difference also includes an overall area of formation of the image. In general, the area of formation of the image may often be reduced to approximately 97 percent to 98 percent of the image of the original document. As a consequence, it is not possible to accurately process an adjustment of the area thereof, and the difference between the image that is formed by the image forming apparatus 100 and the image of the original document may potentially arise. A micro difference would be a difference with regard to each respective shape of the elements that configures the image. As an instance, the difference with regard to each respective shape would denote a bend portion with regard to the two-dimensional bar code.

The CPU 412 includes a density detection unit 413, a determination unit 414, an adjustment unit 415, and a shape detection unit 417. The CPU 412 controls the exposure device 113, the photosensitive drum 101, and the exposure device 113, via the engine 426, as an image forming unit, to form the image. According to the embodiment, when performing the adjustment process, the CPU 412 first forms a patch pattern, which includes one or more patch images selected from among a plurality of types of the patch image data that is stored in the pattern ROM for matching 419, upon the photosensitive drum 101 as the toner image. It is to be understood that the term "patch image" denotes an image that includes a particular shape, such as an L shape, a convex shape, or a cross shape, and that the term "patch pattern" denotes an image that is actually formed in a generation by combining a plurality of patch images. Thereafter, the density detection unit, i.e., a pattern reading unit, 413 employs the density detection sensor 105 to detect the density of the patch pattern and read the patch pattern. In the present circumstance, the CPU 412 employs the plurality of types of the patch image to form a plurality of the patch pattern and compare to the patch patterns thus read, in order to determine whether or not a difference with regard to a given patch image is large.

The determination unit 414 functions as a first determination unit, and determines the difference between the shape of a patch image that is derived from the density thus detected and the shape of the patch image that is stored in the pattern ROM for matching 419. Put another way, in the present circumstance, a measurement is made as to whether or not the shape of each individual patch image is formed correctly. The determination unit 414 functions as a third determination unit, and employs the patch pattern that is read by the density detection unit 413 and the patch image that is stored in the pattern ROM for matching 419 to determine the difference of an overall location of the patch pattern that is formed thereby and the difference of an area thereof. In the present circumstance, the term "overall location" refers to an exterior frame of the patch pattern, and not to a location of each respective patch image of the plurality of the patch images that forms the patch pattern. The term "difference of the overall location" refers to a deviation from a desired location for the formation. Put another way, the difference of the overall location is a deviation in the logical location of the length, the width, the height, and the location of the patch pattern. The determination unit 414 includes an identification unit 418, for identifying the type of shape of the patch image wherein the difference is detected. The identification unit 418 identifies the type of the patch image that is determined to include the difference from among the plurality of the patch images whose shapes differ and that are included in the patch pattern thus formed. Doing so makes it possible to identify whether or not a given site in which the difference has arisen is the bend portion of a given location with regard to the two-dimensional bar code. A detailed description of a method of the identification thereof will be provided hereinafter, with reference to FIG. 11. The image pattern processing unit 410 corrects the patch image that is of a type that is identical to the patch image that is identified herein, and that is included in the two-dimensional bar code.

The adjustment unit 415 adjusts the image forming condition with respect to a pixel that achieves the deviation from the patch image that is stored in the pattern ROM for matching 419, from among a plurality of pixels that configure the patch of the particular shape image. Specifically, the adjustment unit 415 adjusts, at a minimum, one or another of a quantity, or a diameter, of an exposure spot, i.e., a dot, for imaging a single pixel by an exposure. In the present circumstance, the term "pixel" refers to a single square, i.e., a cell, which is a minimum unit that configures the two-dimensional bar code. The term "exposure spot" denotes the shape of an exposure spot that is outputted when the exposure device 113 forms the electrostatic latent image. Hereinafter the exposure spot will be referred to as a "dot." The adjusted information is outputted to the image pattern processing unit 410 and is used when actually forming the two-dimensional bar code. The adjustment unit 415 adjusts the location of commencing the formation of the electrostatic latent image with regard to the exposure device 113 from the difference of the overall location thus determined. The adjustment unit 415 further adjusts the quantity of light to which the drum 101 is exposed by the exposure device 113 in order to form the electrostatic latent image from the difference of the overall area of the patch pattern. The image pattern processing unit 410 corrects the image data so as to take into account the quantity of the adjustment of the quantity and the diameter of the dot that is adjusted by the adjustment unit 415, when forming the two-dimensional bar code. In the present circumstance, the term "quantity of the adjustment" denotes information of the quantity and the diameter of the dot that is outputted from the adjustment unit 415.

The shape detection unit 417, for instance, detects the type of patch image that is included in the image data of the two-dimensional bar code that is read by the reading unit 403, and the location of the patch image with regard to the two-dimensional bar code that is read thereby. In the present circumstance, the term "location" denotes a location in the image wherein the two-dimensional bar code is formed. The image pattern processing unit 410 identifies a cell wherein the difference has been identified and a cell that is to be corrected with respect to the type and the location of the patch image that is detected by the shape detection unit 417, and corrects the image data of the two-dimensional bar code so as to take into account the quantity of the adjustment of the cell thus identified.

<Patch Image>

Figure 5:
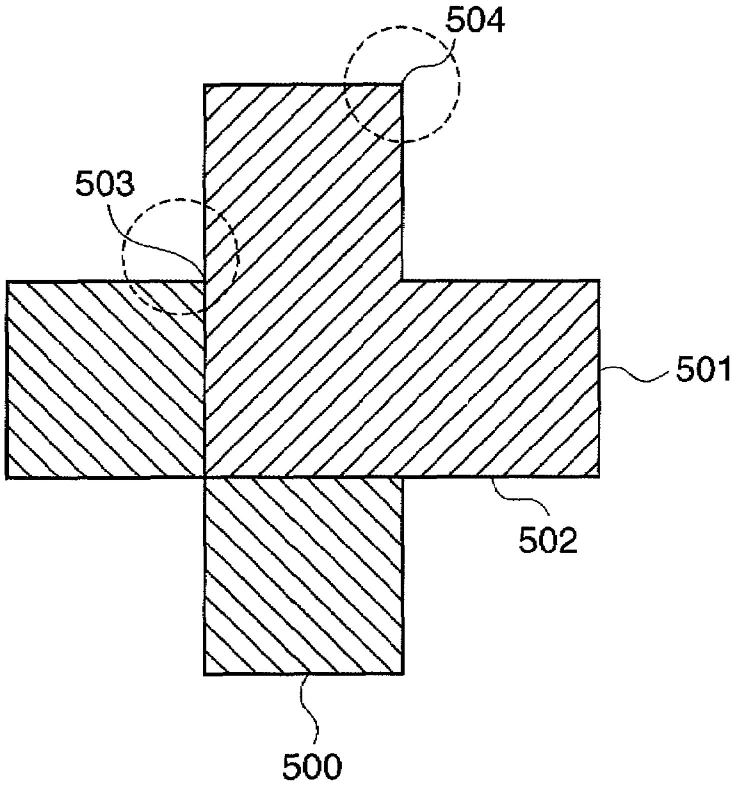
FIG. 5 illustrates an instance of a patch image.
Figure 6:
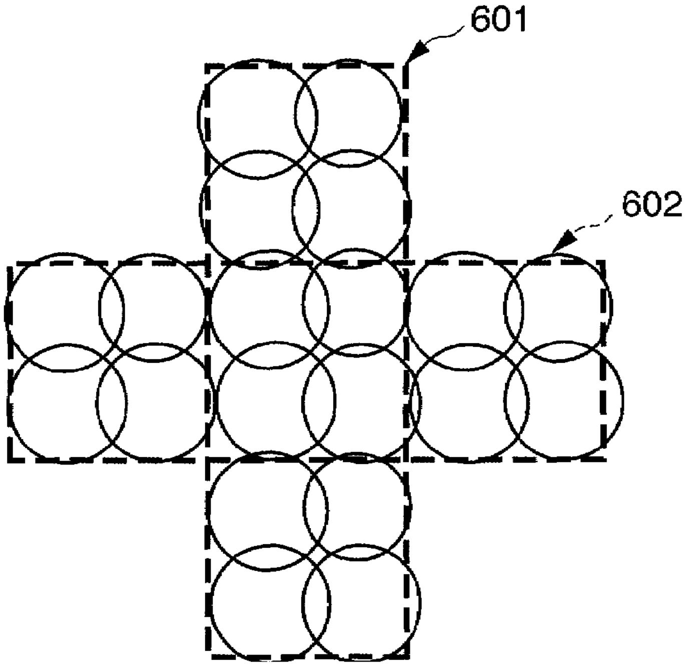
FIG. 6 illustrates a latent image pattern of the patch image that is formed upon the photosensitive drum.

The following is a description with regard to the patch image that is used in the adjustment process according to the embodiment, with reference to FIG. 5 through FIG. 7. In the present circumstance, an instance of the patch image that is used according to the present invention will be described. Put another way, any shape would be permissible as the patch image that is employed according to the present invention, if the shape includes a characteristic that is described hereinafter. It is to be understood the patch image that is described in the present circumstance includes a shape that is effective in ameliorating the micro difference.

FIG. 5 illustrates an instance of the patch image. A patch image 500, such as is illustrated in FIG. 5, includes an element of a vertical line 501, a horizontal line 502, an interior corner 503, and an exterior corner 504. A detailed description of the interior corner 503 and the exterior corner 504 will be provided hereinafter. The element illustrated herein is included in all of the patch images that configure the two-dimensional bar code such as the QR Code. Accordingly, the image forming apparatus 100 is capable of improving the precision with which the two-dimensional bar code is formed by identifying a difference of each respective shape and making adjustments as appropriate. When the determination unit 414 determines that the micro difference, i.e., the difference in the shape of the patch image, the determination unit 414 executes pattern matching by examining each respective shape thereof.

FIG. 6 illustrates a latent image pattern of the patch image that is formed upon the photosensitive drum. A dashed line in FIG. 6 denotes original document pattern 601. The original document pattern 601 denotes a logical shape that the image data that is stored in the pattern ROM for matching 419 represents. In the present circumstance, a single rectangle region that is surrounded by the broken line is a single pixel.

The dot, i.e., the exposure spot, denotes a latent image pattern 602. The latent image pattern 602 denotes a shape that is formed from a plurality of the dots when the drum 101 is exposed to light by the exposure device 113. As an instance, in the present circumstance, what is exemplified is one pixel being configured of four dots with respect to the latent image pattern 602. In general, each respective dot of the latent image thus formed includes a given circular shape, and the further from a center of the dot to an outer edge thereof, the lower the quantity of light becomes. In particular, a method or a shape of the forming of the dot changes significantly depending upon the size and the gradient of the quantity of light. Accordingly, normalizing the size of the quantity of light and a wavelength of a diameter of the latent image, i.e., the diameter of the dot, allows faithfully reproducing the original document pattern 601. As a single pixel is thus imaged by the plurality of the dots, the difference of the shape between the original document pattern and the patch image thus formed is ameliorated by adjusting the shape of the dot. As an instance, if the interior corner 503 is formed of a shape that expands, it is possible to bring the interior corner 503 more in line with the logical shape by thinning out the dot with regard to the difference thus detected.

The following is a definition with regard to the interior corner 503 and the exterior corner 504. The patch image is a polygon that is configured by a pixel array, i.e., a first pixel array, and another pixel array, i.e., a second pixel array, that intersects the first pixel array at right angles, which is formed from a plurality of a sequence of pixels, i.e., the cell. The interior corner 503 is a portion with regard to the polygon that arises from the intersection of the first pixel array and the other pixel array at an exterior angle is 90 degrees. Put another way, the interior corner 503 is an angle portion that arises from contact of the vertical line 501 and the horizontal line 502 that is included in a different pixel, and a shape thereof forms an exterior angle of 90 degrees. It is to be understood that it would be permissible for the interior corner 503 not to be 90 degrees, if the interior corner 503 is of an angle that allows the formation of the two-dimensional bar code. The exterior corner 504 is a portion that is formed by a dot that is included in another pixel and a dot that does not contact another pixel. Put another way, the exterior corner 504 is an angle portion that arises from contact of the vertical line 501 and the horizontal line 502 that is included in a common pixel, and that does not contact another pixel, wherein the shape thereof forms an exterior angle of 270 degrees, i.e., an interior angle of 90 degrees. Put another way, six of the vertical lines 501, six of the horizontal lines 502, four of the interior corners 503, and eight of the exterior corners 504 are present in the patch image 500 that is illustrated in FIG. 5.

FIG. 7 illustrates a plurality of the patch images according to the first embodiment. In the present circumstance, a description will be provided with regard to the plurality of the patch images that is used according to the embodiment. The patch image that is used according to the embodiment includes four types of shapes: a line shape patch image A, an L shape patch image B, a convex shape patch image C, and a cross shape patch image D. As described herein, each respective patch image is configured of at least three elements of the vertical line 501, the horizontal line 502, the interior corner 503, and the exterior corner 504. A count quantity of each respective element with the patch image A, for instance, would be two of the vertical line 501, two of the horizontal line 502, and four of the exterior corner 504, with zero of the interior corner 503. On the other hand, each respective count quantity of the vertical line 501, the horizontal line 502, the interior corner 503, and the exterior corner 504 of the patch image D would be six, six, four, and eight, respectively. The quantity of each respective element of the patch image that is employed according to the embodiment accordingly varies. It is thus possible to identify the type of the patch image by detecting the quantity of each respective element of the patch image that is formed, and it is thus possible to identify with ease whether or not a difference has been detected with each of the patch images that is formed. The identification unit 418 identifies whether or not the difference arises with each of the patch images by comparing the degree of the difference that is detected with each respective patch image. A detailed description of the method of the identification thereof will follow hereinafter, with reference to FIG. 11.

<Two-Dimensional Bar Code>

Figure 8:
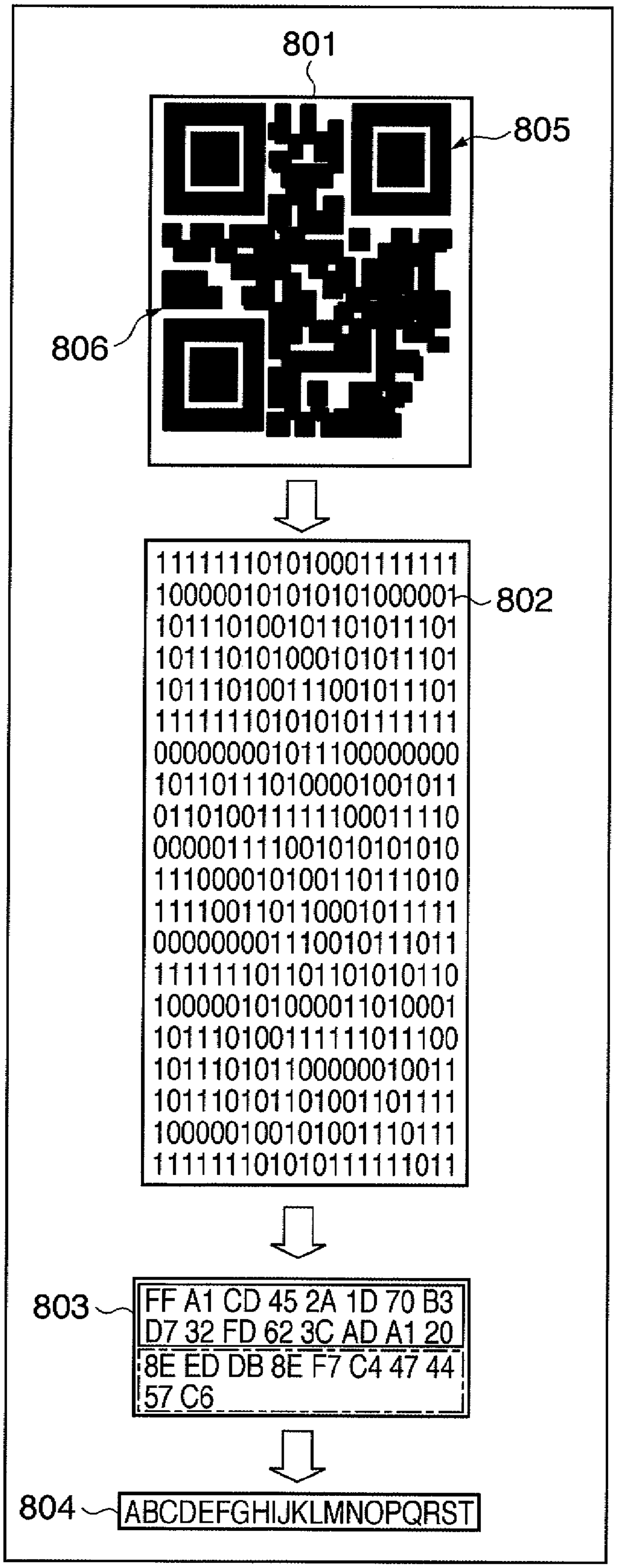
FIG. 8 illustrates an instance of a two-dimensional bar code and a method of read the two-dimensional bar code.

The following is a description with regard to the QR Code that is an instance of the two-dimensional bar code, with reference to FIG. 8. Also described in the present circumstance is a sequence of reading the two-dimensional bar code. FIG. 8 illustrates the instance of the two-dimensional bar code and a method of reading the two-dimensional bar code.

A QR Code 801 that is the two-dimensional bar code, such as is illustrated in FIG. 8, is configured from a combination of the element of the vertical line 501, the horizontal line 502, the interior corner 503, and the exterior corner 504. The QR Code 801 is an optically readable pattern. The reading unit 403 illuminates the QR Code 801 by lighting a light of a light driving circuit. A process is carried out wherein the image that is formed as described herein is converted into an electrical signal, and thus made into a binary value. Thereafter, the CPU 412 stores a resulting binary value data upon the CPU 412.

The CPU 412 detects a code component of the data thus read. With respect to a light and a dark component, i.e., a black and white component, the CPU 412 replaces the white component, i.e., a cell, with a "0," and the black component with a "1," thereby generating a bit matrix 802, such as is illustrated in FIG. 8. The detection of the code component is performed by using a characteristic of the QR Code 801, such as is described hereinafter.

The QR Code 801 is configured with a light or a dark cell, i.e., a pixel, that is lined up in two directions, a horizontal and a vertical direction, respectively, and an arrangement of a plurality of the cells denotes a prescribed function. Broadly speaking, the QR Code 801 comprises a function pattern region 805 and an encode pattern region 806. The function pattern region 805 comprises a finder and a timing pattern. The finder is installed in three sites, and is used as a symbol for determining a location thereof. When optically reading the QR Code 801, the finder is first detected. The finder is a pattern with a characteristic ratio of light to dark that does not depend on a scan direction, for instance, 1 (dark):1 (light):3 (dark):1 (light):1 (dark). Accordingly, it is possible to detect the finder by detecting the characteristic ratio thereof. Detecting the finder determines the location, the size, and the gradient of the code, and thereby extracts the code from a background thereof. The timing pattern that is arrayed in alternating light and black cells between each respective finder is further detected, and a center location of another cell is derived from a center location of the timing pattern. It is possible to identify the location of each respective cell and obtain the bit matrix 802 by way of such a process.

The QR Code 801 is drawn in recent times with a very small pattern. A width of the cell that forms the QR code 801 is at most on the order of 1 mm. As a consequence, a determination with a resolving power of 250 μm or less in order to determine the image quality of the QR Code thus formed would have no small effect on a resolution greater than or equal thereto. Given also that the length of one side of the QR code 801 is at most on the order of 50 mm, it would be permissible to employ a patch image with a length of 50 mm or less on a side to execute the adjustment process. Whereas a lower limit of the length of the side with regard to the patch image is dependent upon the sensitivity of the density detection sensor 105 and 107, it is presumed that a minimum length of 10 mm would be necessary in order to increase the precision of calculating an area thereof.

The following is a description with regard to a decoding. A data code word group 803 that is illustrated in FIG. 8 is an instance that displays a portion in a hexadecimal format. Source data 804 is further extracted therefrom, according to a predetermined rule that is recorded in a mode. A "mode" is information that classifies information recorded in the data code word group 803 as one of data of a numeral, an alphanumeric character, and a Japanese character. The decoding of the QR Code 801 is thus performed in accordance with reflectivity property, i.e., shade, the density, and the dot reproducibility of the device that forms the QR Code image becomes crucial as a consequence.

<Difference with Original Document Image>

Figure 9:
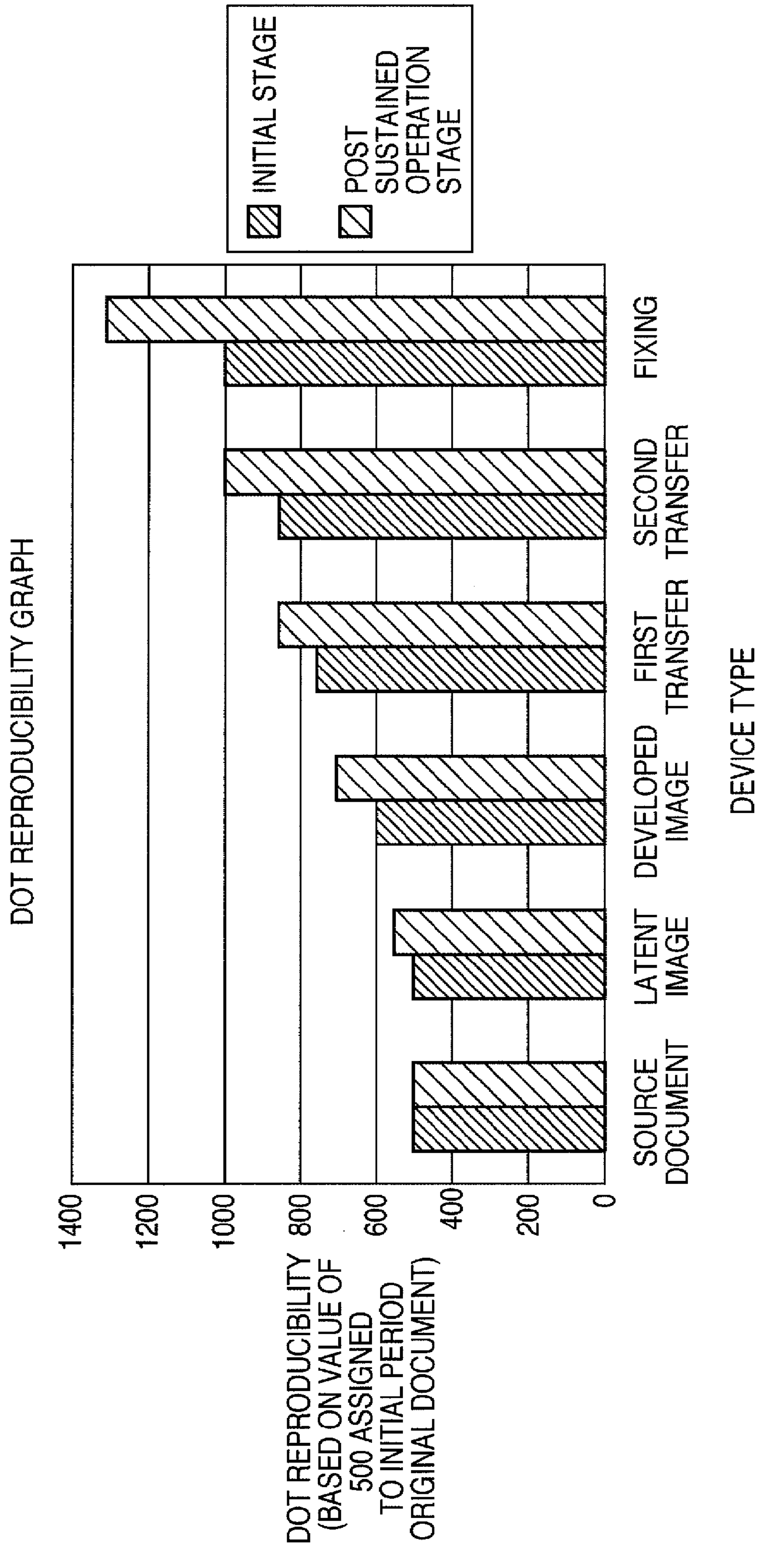
FIG. 9 denotes a graph of dot reproducibility with regard to the image forming apparatus.

The following is a description of a site wherein a difference arises between an original document image and an image that is formed therefrom with regard to the image forming apparatus 100, with reference to FIG. 9. The difference, such as a misalignment or a discrepancy, between the image that is formed and the original document image data that arises when the image is formed will be described hereinafter. A misalignment of the overall location of the formation of the image arises from the lack of precision of the exposure device 113 writing out the electrostatic latent image or from the lack of precision in the operation of a motor driving assembly or a recording material conveyance assembly. A discrepancy in the dot reproducibility with regard to the image forming apparatus is due to a fault in each respective configuration element in the image forming apparatus. As an instance, the discrepancy arises when reading the original document because of an ADF conveyance fault, a floating of the original document, a fault in the CCD 424, and a light source fault. The discrepancy also arises when processing the image data because of a fault in the A/D conversion, the gamma process, or the shading correction thereof. When forming the image, a discrepancy in the quantity of light of the exposure device 113, the misalignment of the location of writing out the electrostatic latent image, a misalignment of a phase thereof, a fluctuation of the quantity of light, an eccentricity of the photosensitive drum 101, an irregularity in the electric potential of the photosensitive drum 101, or an irregularity or a fogging of the developer solution further arise as a result of a scattering or a tailing of the toner. The scattering or the tailing of the toner arises at the image transfer locations 111 and 112, as does a skipped transfer or a repeated transfer. A phenomenon may cited with the fixing unit 108, such as a dot damage or the toner of a line image being scattered by the heat and the pressure that emanate from the fixing unit. It is thus possible for the difference between the original document and the image that is formed therefrom to arise in a wide range of sites.

The vertical line 501 or the horizontal line 502 will not be image formed with a high degree of precision, owing to an insufficient quantity of charge of the developer solution or a degradation of a material that is used therewith. The interior corner 503 or the exterior corner 504 will not be image formed with a high degree of precision, owing to a feedback of an electric field upon the photosensitive drum or an instability of the electric potential of the latent image. An angular shape is therefore not suitable with regard to the interior corner 503 or the exterior corner 504.

FIG. 9 denotes a graph of the dot reproducibility with regard to the image forming apparatus. The vertical axis of the graph denotes the dot reproducibility, and the horizontal axis denotes each respective step of the formation of the image. It is to be understood that a measurement of the dot reproducibility is executed at an initial stage that is subsequent to using the image forming apparatus 100 and at a post sustained operation stage. The term "initial stage" denotes a stage that is subsequent to forming 10,000 images upon the installation of the image forming apparatus 100. The term "post sustained operation stage" denotes a stage that is subsequent to forming approximately 250,000 images. A plurality of 5×5 dot images is formed at 1200 dpi, and the area of the image that is formed thereby is measured at each respective step of the process. Specifically, the 5×5 dot image is measured at six sites, with a value thus measured being divided by 150, i.e., 5×5×6, an area of 1×1 dot, at 1200 dpi, computed. Based on the calculation thereof, the area of 1×1 dot is 21 $\mu$m×21 $\mu$m=441 $\mu m^2$.

The description herein presumes that the area of 1×1 dot of image data that will serve as the original document is measured first of all as 500 $\mu m^2$. A measurement result that is illustrated in FIG. 9 denotes that the further a measurement value diverges from the 500 value, the lower the dot reproducibility becomes. The further along the process goes, from an initial stage of the original document, which occurs immediately after the reading of the original document, to the latent image, the developing material image, the first transfer, the second transfer, and finally the fixing of the image, the lower the measurement result at each respective step of the process becomes, i.e., the image quality, which is the dot reproducibility. Moreover, a post sustained operation measurement is 550 when forming the electrostatic latent image, and 1300 after the fixing of the image. As an instance, when performing the adjustment process by forming the patch image upon the recording material and reading the patch image with the reading unit 403, it is difficult to detect the difference in the shape that arises in the latent image or the developing material image by reading an image whose image quality has deteriorated subsequent to the fixing thereof. Thus, according to the embodiment, the image forming apparatus 100 forms the patch image upon the photosensitive drum 101 and executes the adjustment process, rather than forming the patch image upon the recording material. Doing so allows minimizing the wasteful consumption of the recording material and a time required to carry out the adjustment process.

<Density Detection Control>

Figure 10:
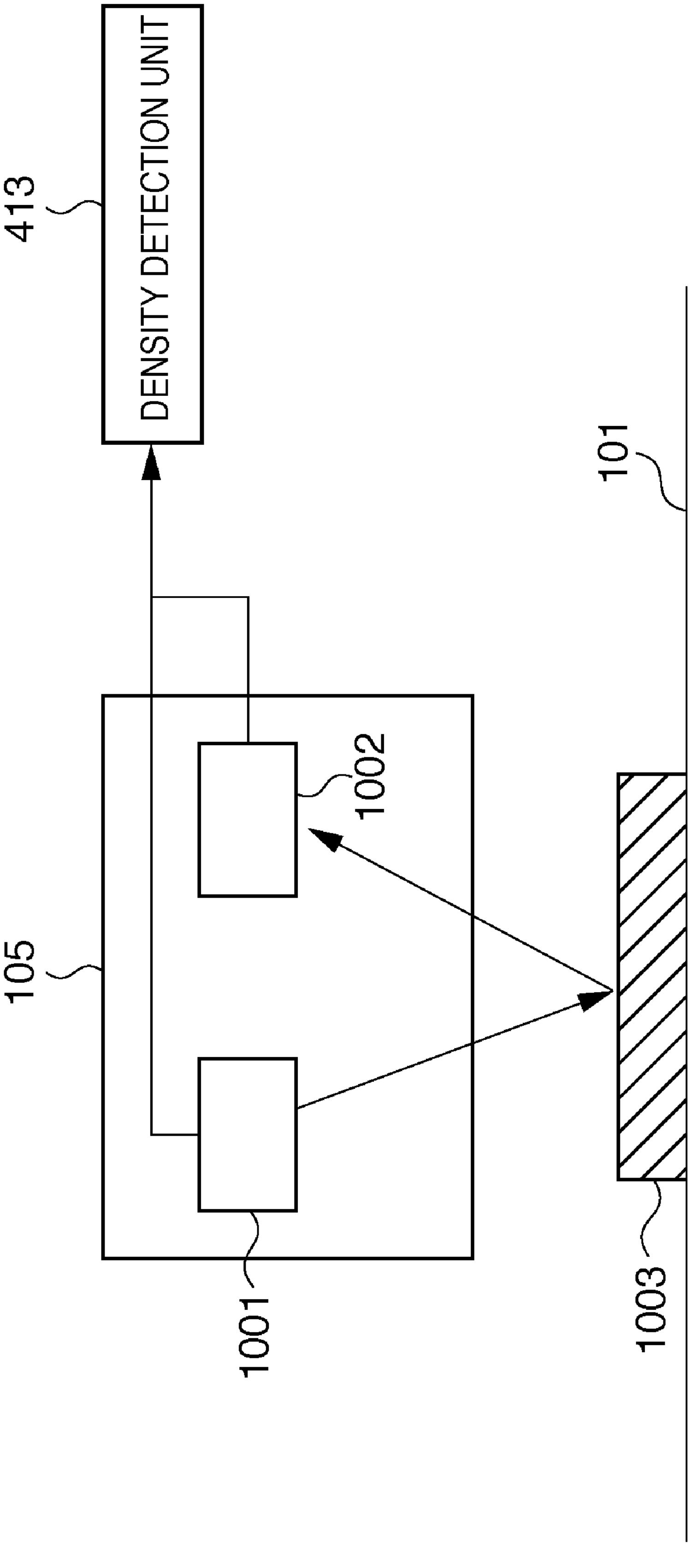
FIG. 10 illustrates control of a density detection according to the first embodiment.
Figure 12A:
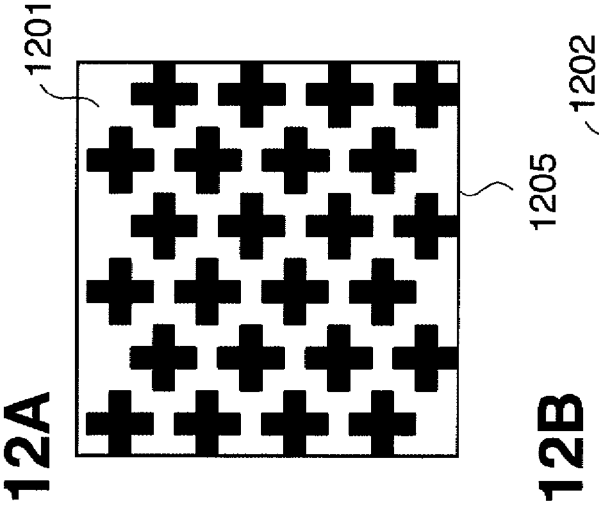
FIG. 12A to 12D illustrate a method of detecting a difference of a location of a forming of a patch pattern and an area thereof.
Figure 12B:
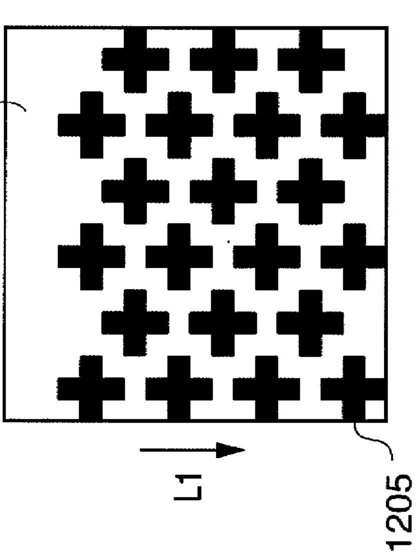
Figure 12C:
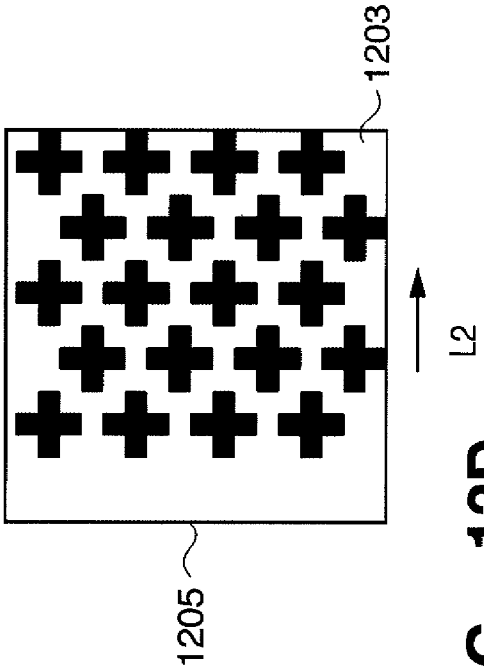
Figure 12D:
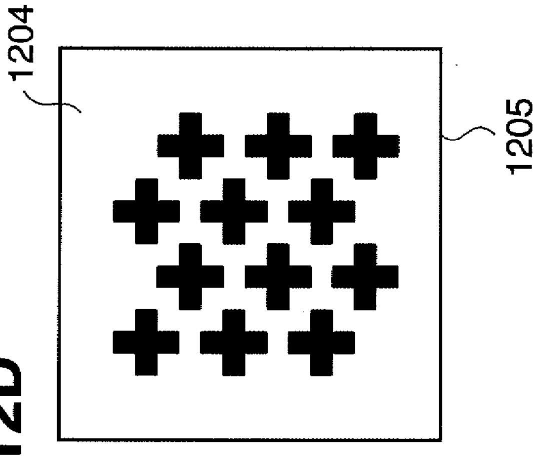

The following is a description of the control of the density detection, with reference to FIG. 10. FIG. 10 illustrates the control of the density detection according to the first embodiment. Whereas an instance of the density detection sensor 105 is described, a similar control of the detection is performed with the density detection sensor 107 as well.

Reference numeral 1003 denotes patch image after the development thereof that is formed upon the photosensitive drum 101. The density detection sensor 105 comprises a pair of a light emitting element 1001 and a light reception element 1002, which is an optical sensor. When performing the detection of the density, the light emitting element 1001 first projects light upon a patch image 1003. The light that is projected is reflected by a surface of the patch image 1003, and is received by the light reception element 1002. The received light signal that is outputted from the light reception element 1002 is inputted into the density detection unit 413. The density detection unit 413 uses a table that is stored in the ROM or the hard drive 421 to determine the density. The table stores data that associates a value of the received light signal with the density.

The density that is detected by the density detection unit 413 is used in the adjustment process described herein. It is possible to use the density thus detected in the correction of the tone of the image that is formed herein as well. As an instance, it would be possible to form a half tone patch image upon the photosensitive drum 101 in accordance with image data via the look-up table, and to execute the correction of the tone thereof by verifying whether or not the density thereof conforms to a regulation thereof. If the density thereof does not conform to the regulation thereof, the correction of the tone thereof is performed. Specifically, image for measurement of a 30 H hexadecimal tone level, i.e., a 48 tone level in decimal, of a tone from 0 to FFH in hexadecimal, i.e., 0 to 255 in decimal, is formed upon the photosensitive drum 101. It is presumed that a regulation density with regard to the 30 H dot is 0.3. If it is presumed that an actual measured density value in the present circumstance is 0.2, an increment corresponding to 0.1 is added in the 30 H component, and another tone component thereof is controlled to increase or decrease in response to a quantity of a change of the 30 H.

<Adjustment Process>

The following is a description of the adjustment process according to the embodiment, with reference to FIG. 11 through FIG. 15. FIG. 11 illustrates a plurality of types of the patch image. In the present circumstance, a description will be provided of a patch pattern for determining the difference of the shape of the patch image, the difference of the location of the formation of the overall patch pattern, and the difference of the area of the overall patch pattern. The term “patch pattern” refers to a pattern image that is formed by arranging a plurality of one type of the patch image that is selected from the plurality of the patch images that is stored in the pattern ROM for matching 419 when performing the adjustment process; refer to FIG. 12 for an instance thereof. It is to be understood that it would be permissible for the patch pattern to be stored in the pattern ROM for matching 419 prior to the use thereof.

The patch pattern according to the embodiment is an image that is formed by selecting from among a patch image A, A-2, B, B-2, B-3, B-4, C, or D, and arranging a plurality of one type of the patch pattern that is selected. All of the patch pattern is configured such that the total area of the patch images that is included therein is identical. FIG. 11 illustrates a parameter of each respective patch image. A value in a “vertical” row and a “horizontal” row therein denotes the length of the vertical line 501 and the horizontal line 502, respectively. In the present circumstance, it is presumed that the length of one side of one cell is two. An “upper left hand,” an “upper right hand,” a “lower right hand,” and a “lower left hand” therein denote an orientation of the interior corner 503, and a value of each respective row thereof denotes a quantity of each respective patch image that is included therein. It is to be understood that in the present circumstance, the term “orientation of the interior corner” denotes a direction with regard to the vertical line 501 and the horizontal line 502 that configure the interior corner 503 where no pixel, i.e., no cell, is present. As an instance, with regard to the patch image B, a pixel is present upon a right hand side of the vertical line that configures the interior corner, whereas no pixel is present upon a left hand side thereof. In addition, a pixel is present upon a lower side of the horizontal line that configures the interior corner, whereas no pixel is present upon an upper side thereof. Accordingly, the orientation of the interior corner in the present circumstance is the upper left hand. A value in an “exterior corner” row denotes a quantity of each respective patch image that is included in the exterior corner 504. A value in a “pixel” row denotes a quantity of a pixel, i.e., a cell, that forms each respective patch image. A value in a “patch quantity” row denotes a quantity of the patch image when arranging the plurality of the patch images to form the patch pattern. Adjusting the patch quantity equalizes the area of the pixel that is formed with regard to all of the patch patterns. A value in an “area” row denotes an area per each respective single patch image. A value in a “total” row denotes a product of the “patch quantity”×the “area.”

With regard to the patch image B, such as is illustrated in FIG. 11, a patch image is also formed by rotating the patch image B in a series of a 90 degree intervals, i.e., B-2, B-3, and B-4. Doing so is necessary in order for the identification unit 418 to identify whether or not a difference has arisen in a shape of the interior corner 503 that is facing in any given direction, for instance, the upper left hand, the upper right hand, the lower right hand, or the lower left hand direction. Forming the patch images B, B-2, B-3, and B-4 upon the photosensitive drum 101 as all of the patch pattern allows identifying whether or not the difference has arisen in any of the interior corners 503 by comparing the degree of the difference. Specifically, if the patch image among the patch image B, B-2, B-3, and B-4 thus formed with the largest degree of the difference from an ideal shape is the patch image B-3, it would be understood that the difference has arisen in the bend portion that includes the interior corner 503 at the lower right hand portion of the image. By thus identifying the type of the shape of the patch image, it is possible for the image forming apparatus 100 to correct the bend portion of the corresponding type when forming the QR Code 801.

FIG. 12A to 12D illustrate a method of detecting the difference of the location of the forming of the patch pattern and the area thereof. Reference numeral 1201 denotes a patch pattern that is a baseline thereof, and reference numerals 1202 to 1204 respectively denote a patch pattern that is formed therefrom. Whereas the patch image D is employed in the present instance, it would be permissible to employ any of the patch images that are illustrated in FIG. 11. It would also be permissible for the baseline patch pattern 1201 not to be actually formed upon the photosensitive drum. A frame 1205 that is illustrated in FIG. 12A to 12D denotes a scope of detection by the density detection sensors 105 and 107. In actuality, the patch pattern exceeds the scope of detection thereof as it is formed upon the photosensitive drum 101.

When the difference of the location of the overall patch pattern is detected, the image forming apparatus 100 forms the patch patterns 1202 and 1203. The patch pattern 1202 is formed by shifting a vertical length by 20 percent in a direction of an arrow L1, i.e., downward, from the baseline patch pattern 1201. The patch pattern 1202 is employed with regard to a detection of a location in an up and down direction. The patch pattern 1203 is formed by shifting a vertical length by 20 percent in a direction of an arrow L2, i.e., rightward, from the baseline patch pattern 1201. The patch pattern 1203 is employed with regard to a detection of a location in a left and right direction.

When the deviation of the location in the up and down direction is detected, the CPU 412 detects the density of the patch pattern 1202, computes an area of the density thus detected, and compares the area thus computed with a logical value of an area of the baseline patch pattern 1201. In the present circumstance, as an instance, if the area that is detected and compared with the area of the baseline patch pattern 1201 is only reduced by 18 percent, despite the location of the formation thereof being shifted by 20 percent, the patch pattern is thus found to have deviated up by two percent from the overall logical location. If the area thus detected is reduced by 22 percent, the patch pattern is thus found to have deviated down by two percent from the overall logical location. In the present circumstance, it is possible to ignore the deviation in the left and right directions with regard to the patch pattern 1202. In a similar fashion, it is possible to ignore the deviation in the up and down direction with regard to the patch pattern 1203.

When the difference of the area of the patch pattern overall is detected, the image forming apparatus 100 forms the patch pattern 1204. The patch pattern 1204 reduces the patch image D such that the area of the patch pattern 1204 is approximately 40 percent of the area of the baseline patch pattern 1201. It is to be understood that one reason for reducing the area thus formed in the present circumstance is so as not to influence the detected area, even if the location of the formation deviates in the up, down, left, or right direction. The density of the patch pattern 1204 is detected and the area computed, and compared with the logical area for a difference therewith. As an instance, with respect to 40 percent of the logical area of the baseline patch pattern 1201, if the detected area is 35 percent of the logical area of the baseline patch pattern 1201, a small dot is formed overall. Conversely, if the detected area is 45 percent of the logical area of the baseline patch pattern 1201, a large dot is formed overall.

Figure 13:
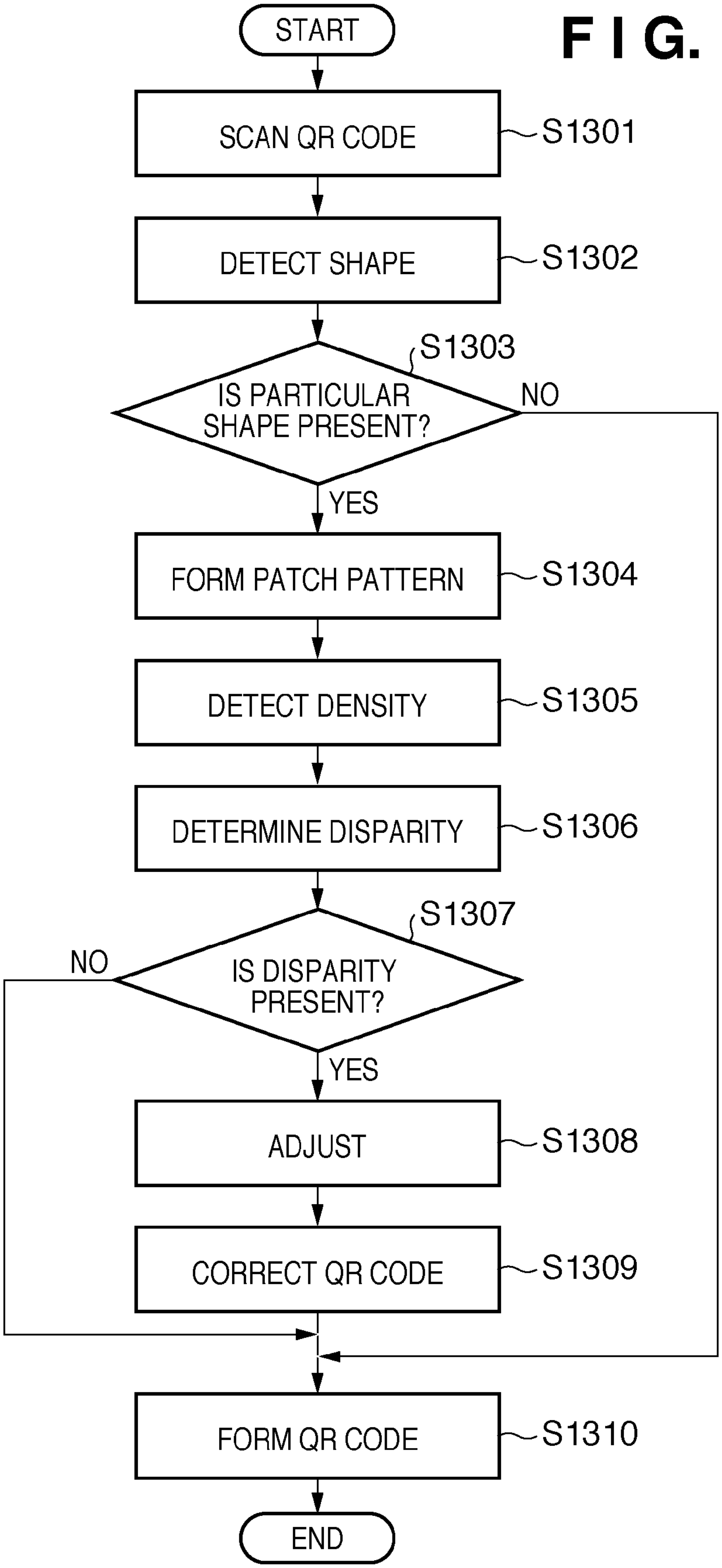
FIG. 13 is a flowchart that illustrates a process of forming a QR Code.

FIG. 13 is a flowchart that illustrates the adjustment process for forming the QR Code. In the present circumstance, it is presumed that the QR Code 801 that is formed upon the recording material is read with the reading unit 403, and the QR Code is image formed upon the photosensitive drum. According to the embodiment, the QR Code 801 is formed upon the photosensitive drum 101 after the adjustment process is executed, according to the condition adjusted thereby. Whereas the adjustment process is executed every time a set quantity of the image formation is performed, it would be permissible for the adjustment process to be executed on a command from the console unit 422.

In step S1301, the reading unit 403 reads in the QR Code 801 from the original document wherein the QR Code 801 is formed, as the image information. In the present circumstance, the original document is placed upon the reading unit 403 by the operator. The image data that is read thereby is conveyed to the CPU 412. In step S1302, the shape detection unit 417 detects, from the image data that is thus conveyed, the element that configures the patch image, i.e., a component of the patch image that corresponds to the vertical line 501, the horizontal line 502, the interior corner 503, and the exterior corner 504. In the present circumstance, if any of the particular shape is detected among such as the vertical line 501 or the interior corner 503, the shape detection unit 417 detects the type, the location, and the quantity thereof that is detected within the QR Code 801. In the present circumstance, the term type denotes the shape of such as the vertical line 501, the horizontal line 502, the interior corner 503, or the exterior corner 504. The term "location" denotes the location in the image of the two-dimensional bar code where the particular shape is present, and the term "quantity" denotes the quantity of each respective type of the particular shape that is included in the image of the two-dimensional bar code. In step S1303, the CPU 412 determines whether or not the particular shape has been detected within the QR Code 801 thus read. If the particular shape has not been detected therein, the CPU 412 causes the QR Code 801 thus read to be formed, in step S1310.

If, on the other hand, the particular shape has been detected, then, in step S1304, the CPU 412 conveys the image data of the patch pattern to be formed to the output pattern ROM 420, and thereby causes the patch pattern to be formed upon the photosensitive drum 101. It is to be understood that when frequently using a given patch pattern, it would be permissible for the CPU 412 to store the patch pattern thus used upon the hard drive 421, and thereby reduce the processing time. In the present circumstance, the CPU 412 reads out all of the patch image that corresponds to the particular shape thus detected from the pattern ROM for matching 419, and generates the patch pattern to be formed. The CPU 412 stores the patch pattern to be formed in the pattern ROM for matching 419. The patch pattern thus stored will be compared with a density to be detected hereinafter.

When the patch pattern has been developed, then, in step S1305, the density detection unit 413 employs the density detection sensor 105 to detect the density of the patch pattern that is formed upon the photosensitive drum 101. The density thus detected is outputted to the determination unit 414. Thereafter, in step S1307, the determination unit 414 determines the difference in the shape thereof, and the difference in the location of the patch pattern overall, with respect to the patch image. Specifically, when determining the shape difference, the determination unit 414 employs the patch pattern that was stored in the pattern ROM for matching 419 in step S1304, and the shape of the patch image that is derived from the density that is detected by the density detection unit 413, to perform the pattern matching. A method of determining the difference in the shape with respect to the patch image will be described hereinafter, with reference to FIG. 14. When determining the difference in the location of the patch pattern overall and the difference in the area of the patch pattern overall, the determination unit 414 determines the difference by way of the detection method that is described with FIG. 12A to FIG. 12D. The difference thus determined by the determination unit 414 is outputted to the adjustment unit 415.

In step S1307, the CPU 412 determines whether or not any of the difference has been determined with the determination unit 414. If the difference has not been found, then, in step S1310, the CPU 412 forms the QR Code 801 that has been read. If, on the other hand, the difference has been found, then, in step S1308, the adjustment unit 415 outputs either the condition of the formation of the image or an information that adjusts the image data of the QR Code 801, in accordance with the information of the difference that is outputted from the determination unit 414.

In the present circumstance, when adjusting the difference of the shape with regard to the patch image, the adjustment unit 415 adjusts at least one of the quantity and the diameter of the dot that is used to render one pixel of the location that includes the particular shape. When adjusting the difference of the location of the patch pattern overall, the adjustment unit 415 adjusts a location wherein the formation of the electrostatic latent image, upon the image carrier, by the exposure device 113, commences, from the difference of the location of the patch pattern overall. Furthermore, when adjusting the difference of the area of the patch pattern overall, the adjustment unit 415 adjusts the light quantity to which the drum 100 is exposed by the exposure device 113 in order to form the electrostatic latent image, from the difference of the area of the patch pattern overall. A description with regard to a specific adjustment method will be provided hereinafter, with reference to FIG. 15.

When the adjustment is completed, in step S1309, the image pattern processing unit 410 corrects the image data of the QR Code 801 according to the information that is outputted from the adjustment unit 415. Specifically, the image pattern processing unit 410 corrects the image data of the QR Code 801 in accordance with the information relating to the particular shape of the QR Code 801 that is detected in step S1302, and the information of either the quantity or the diameter of the dot that is adjusted by the adjustment unit 415. In the present circumstance, the image pattern processing unit 410 adds a correction to all of the component that includes a given shape that is present within the QR Code 801 with regard to the particular shape whereupon the adjustment is necessary. The image data thus corrected is outputted to the exposure device 113. Finally, in order to verify the QR Code that is formed with the condition thus adjusted, in step S1310, the image forming apparatus 100 commences the forming of the QR Code 801 by the exposure device 113.

It is to be understood that, whereas it would be desirable to perform the adjustment process for all of the patch image that is illustrated in FIG. 11, it would be permissible for a single patch image, for instance, the patch image D, to be a representative of the patch image, in the adjustment process, in order to shorten the time required for the adjustment thereof. It would also be permissible to perform the adjustment process for each batch of a prescribed quantity of the plurality of types of the patch image in sequence on each execution of the adjustment process thereupon.

FIG. 14 illustrates a result when the adjustment process is executed according to the first embodiment. In the present circumstance, a description will be provided of the result of carrying out four types of test trials, from a test trial 1-1 to a test trial 1-4. With regard to the present test trial, five types of a patch images A, A-2, B, C, and D, are formed upon the photosensitive drum 101, and a result of the formation thereupon is compared. A condition of the formation thereof varies with regard to each respective test trial.

The test trial 1-1 was conducted in a state with a temperature of 23 degrees C. and a humidity of 59 percent, following a feeding of approximately 100,000 sheets. A value of 31,500 signifies that the original patch image and the patch image formed therefrom are the same. A value greater than 31,500, for instance, 33,000, denotes that the shape of the patch image overall deviates toward a positive direction by approximately four percent. A value of 28,000, on the other hand, denotes instead that the shape of the patch image deviates toward a negative direction by approximately 12 percent. With regard to the test trial 1-1, the five types of an S patch are all identical to a target, which may be considered an ideal precision with respect to the formation of the image.

The test trial 1-2 was conducted in a state with a temperature of 25 degrees C. and a humidity of 70 percent, following a feeding of approximately 150,000 sheets. A result thereof was that all of the patch image deviated in the negative direction, with a quantity of the deviation of the patch image A-2 being particularly significant. It was apparent therefrom that the vertical line 501 was becoming smaller. In a similar manner, the test trial 1-3 was conducted in a state with a temperature of 28 degrees C. and a humidity of 65 percent, following a feeding of approximately 250,000 sheets. A result thereof was that the shape of the patch image A deviated significantly in the negative direction. It was apparent therefrom that the horizontal line 502 was becoming smaller. With regard to the test trial 1-4, a test trial result for the patch image A and A-2 is identical, and it is apparent therefrom that no difference is present therebetween. The patch images B, C, and D, however, deviate in the positive direction. It is apparent therefrom that the interior corner 503, which is a parameter of the shape thereof, is having an influence thereupon. The quantity of an increase of the patch image B, which includes the interior corner 503 at an upper left hand thereof, is particularly significant. Put another way, it is apparent therefrom that the interior corner 503 that faces the upper left hand is greater than the logical shape, deviating by approximately 20 percent therefrom. Measuring the plurality of types of the patch images allows detecting the difference of the particular shape. In addition, forming the patch image that faces an upper left hand, an upper right hand, a lower right hand, and a lower left hand, with respect to the interior corner 503, and comparing the patch image thus formed, allows identifying whether or not the difference has arisen in any of the type of the interior corner 503.

FIG. 15 illustrates the method of adjusting the difference of the image according to the first embodiment. In the present circumstance, a specific method will be described respectively for adjusting each of the following: the difference of the location of the patch pattern overall, the difference of the area of the patch pattern overall, and the difference of the shape of the patch pattern overall.

If the difference of the location of the patch pattern overall is present, the adjustment unit 415 is capable of responding thereto by changing a direction in which the location of writing out the electrostatic latent image in the forward scan direction and the reverse scan direction, and the phase thereof, is deviating, to a direction that is opposite to the direction of the deviation thereof. If the difference of the area of the patch pattern overall is present, the adjustment unit 415 performs the adjustment of the quantity of light that is outputted from the adjustment unit 415. As an instance, if the area is formed small, the adjustment unit 415 either increases the quantity of light with an IAE exposure formula, or adjusts a dot pattern of a dot boundary unit. The adjustment of the dot pattern refers to bringing the shape closer to the ideal form by thinning the quantity of the dots by one half, or by increasing the quantity of the dots thereof.

If the difference of the shape of the patch pattern overall is present, the adjustment unit 415 is capable of bringing the pixel in which the difference is detected closer to the ideal state by carrying out a process such as the thinning out of the dots or a process of a thickening of the dots. The thinning denotes, as an instance, not striking a half of a two bit per one pixel. The thickening process refers, as an instance, to adjusting the quantity of light when forming the dot, which facilitates making a single pixel into one and a half pixels by changing the diameter of the dot. It is to be understood that, whereas the quantity of the data of the single pixel increases to four bits at 2400 dpi, and eight bits at 4800 dpi, and thus, the quantity of the data of the single pixel is dependent upon the output resolution thereof, it is possible to improve the precision even as the processing time increases. Specifically, when the shape of the interior corner 503 that is located in the upper left hand is detected to be thickening, the adjustment unit 415 thins the quantity of the dots with regard to the pixel of the location that is adjacent to the interior corner 503. As an instance, if the single pixel is rendered with four dots, the adjustment unit 415 outputs information that adjusts the pixel in the location to be rendered with two dots to the image pattern processing unit 410. Conversely, when the shape of the interior corner 503 is detected to be becoming thin, the adjustment unit 415 increases the quantity of light when forming the dot, and thereby adjusts the diameter of the dot.

FIG. 15 denotes the precision and a time spent on an analysis therewith, when a 1200 dpi image forming apparatus is employed to carry out the adjustment process for 11 types of patch images, to perform the correction of the location, the correction of the area, and the correction of the shape. In the present circumstance, the time for the analysis is denoted in seconds (sec). With regard to a conventional instance, the patch pattern is outputted to the recording material, and analyzed by a reading device. As a consequence, the precision is on the order of 85 percent when it is not possible to determine a finely detailed dot reproducibility, and on the order of 100 percent when a near perfect match occurs, indicating that a gap is emerging in the precision thereof. The analysis time that is required in order to output the patch pattern to the recording material is 60.2, a noticeably lengthy amount of time.

FIG. 15 conversely denotes the result of the adjustment process according to the embodiment in the test trial 1-5 through the test trial 1-7. The test trial 1-5 corrects only the location with the writing out location. As a result, the precision is 80 percent, which deteriorates when compared with the conventional instance. With regard to the test trial 1-7, however, it is possible to improve the precision to 89 percent by the thickening process with regard to the correction of the area, and the thickening and the thinning that is the correction of the shape, in addition to the correction of the writing out location.

[Second Embodiment]

Following is a description of a second embodiment, with reference to FIG. 1 and FIG. 16. According to the embodiment, a density of the patch pattern that is transferred to the intermediate transference belt 106 is detected, in addition to the detection of the density that employs the patch pattern that is formed upon the photosensitive drum 101, according to the first embodiment. Accordingly, the density is detected at the location further along in the performance of the process of forming the image by the photosensitive drum 101, unlike the process according to the first embodiment. It is thus possible to detect a difference when the patch pattern that is formed upon the photosensitive drum 101 is transferred to the intermediate transference belt 106.

The image forming apparatus 100 according to the embodiment employs the density detection sensor 107 that is illustrated in FIG. 1 to detect the density of the patch pattern that is transferred to the intermediate transference belt 106. The shape of the patch image and the control of the detection of the density are similar to the patch image and the control of the detection of the density according to the embodiment, and a description with regard thereto will accordingly be omitted herein. A reflectivity of a substrate thereof varies between the photosensitive drum 101 and the intermediate transference belt 106, and thus, it is desirable to carry out the detection of the density in response to each respective surface state thereof.

FIG. 16 illustrates a result when the adjustment process is executed with regard to the image forming apparatus according to the second embodiment. Given that the density of the patch pattern that is formed upon the intermediate transference belt 106, in addition to the detection of the patch pattern that is formed upon the photosensitive drum 101, the time for the analysis increases as compared with the time for the analysis according to the first embodiment. The test trial result, however, shows the time required for analysis that is almost identical to the time required for analysis of the conventional instance, and thus, the post correction precision, i.e., the pattern matching precision, is stabilized at a high level. The adjustment unit according to the embodiment performs the adjustment from an optimal solution of the density that is detected via the photosensitive drum 101 and the intermediate transference belt 106. It would be permissible to treat an averaged value of the two densities that are detected via the same patch pattern as the optimal solution.

[Third Embodiment]

Figure 17:
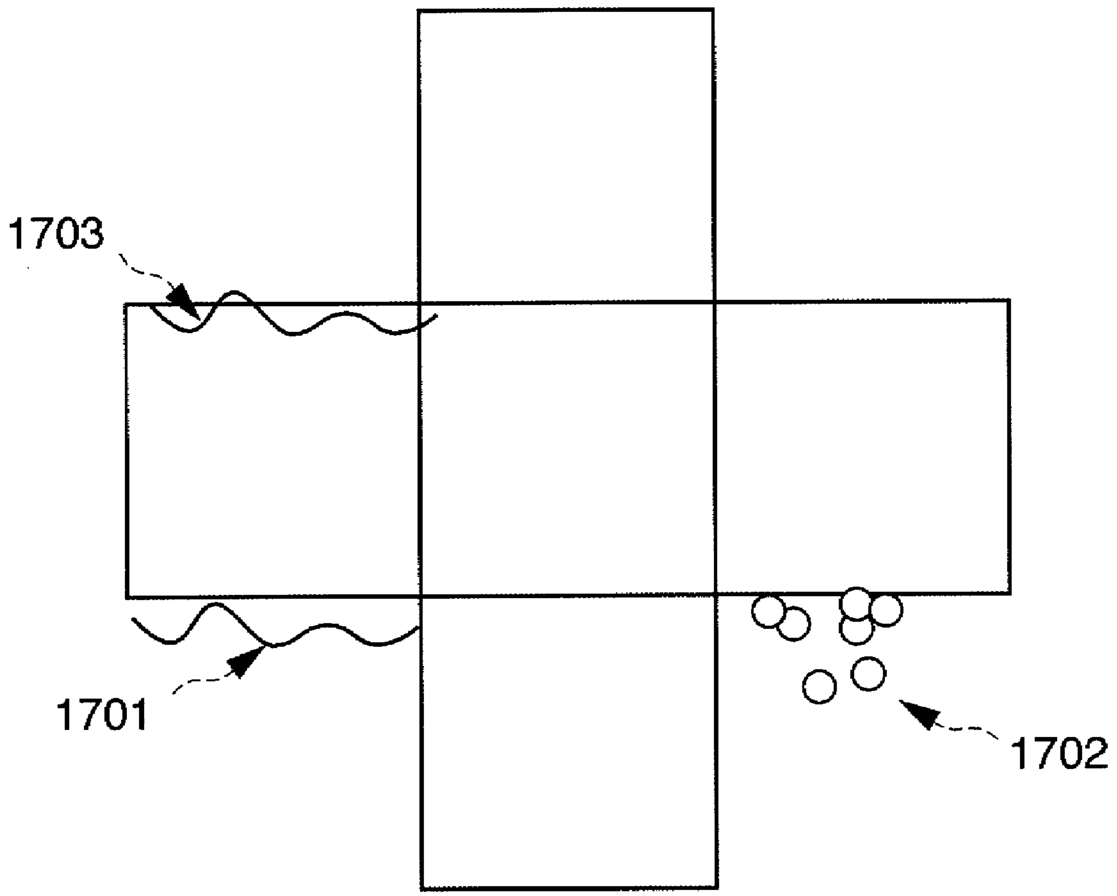
FIG. 17 illustrates a tailing, a scattering, and a standard deviation that arises with regard to a formed image.

The following is a description with regard to a third embodiment, with reference to FIG. 17 and FIG. 18. According to the embodiment, a correction is carried out with regard to a tailing, a scattering of the developer solution, and a standard deviation, in addition to the adjustment process that is performed according to the first embodiment. FIG. 17 illustrates the tailing, the scattering, and the standard deviation that arises with regard to the formed image.

As illustrated in FIG. 17, a tailing 1701 denotes a phenomenon wherein a leading tip of the developer solution upon the developing material carrier 103*a* adheres as is to the surface of the photosensitive drum 101, and leaves a tail in a direction below a line. A scattering 1702 denotes a phenomenon wherein the toner that adheres upon the line scatters in a periphery direction thereof, owing to the electrostatic attraction at the time of the transference or the fixing thereof. A standard deviation 1703 denotes a degree of an irregularity with respect to an average height of the line.

The tailing 1701 and the standard deviation 1703 are corrected by carrying out the thickening process and the thinning process upon the pixel of a terminal unit of the line. The scattering 1702 is corrected with the thinning process.

FIG. 18 illustrates a result when the adjustment process is executed with regard to the image forming apparatus according to the third embodiment. In the present circumstance, a description will be provided with respect to a result of executing the correction with regard to the tailing, the scattering, the standard deviation, and an aspect ratio, in addition to the correction of the difference of the location and of the area according to the second embodiment. The aspect ratio denotes a proportion of the vertical line 501 and the horizontal line 502 that is included in the image thus formed. A correction with regard to a difference of the aspect ratio is also performed by way of the thickening process and the thinning process. As a result, while the time required for the analysis thereof increases, owing to an increase in a quantity of data processing, the post correction precision is 97 percent or more. A result of almost 100 percent is noted with regard to a test trial 3-3.

[Fourth Embodiment]

The following is a description according to a fourth embodiment, with reference to FIG. 19. According to the embodiment, the processing time required for a single iteration of the adjustment process is reduced by carrying out the adjustment process at a periodic interval, and reducing a quantity that is corrected when actually forming the two-dimensional bar code. The adjustment process that is performed at the periodic interval is controlled by the adjustment control unit 423 that is illustrated in FIG. 4. A predetermined period for executing the adjustment process at the periodic interval (hereinafter "periodic adjustment process") is stored upon the hard drive 421. As an instance, information would be stored thereupon indicating execution of the periodic adjustment process every 10,000 sheets of the recording material being fed through.

The adjustment control unit 423 accesses the hard drive 421 by way of the CPU 412 and acquires the information of the periodic adjustment process that is stored thereupon. A timer that is included in the CPU 412 is employed in monitoring a timing whereupon the periodic adjustment process is executed, based upon the information thus acquired. When a timing for the execution of the periodic adjustment process is reached, the adjustment control unit 423 executes the adjustment process in a time range wherein a frequency of usage is low, such as late at night. The CPU 412 executes the adjustment process and stores upon the hard drive 421 the information of the adjustment that is obtained thereby. Thereafter, when performing the adjustment process while forming the two-dimensional bar code, the CPU 412 corrects the patch image with the adjustment information that is stored upon the hard drive 421, and forms the patch pattern. The difference is reduced further than usual with the adjustment process that employs the patch pattern thus corrected, allowing a potential minimization of the time required for the adjustment process. It would be permissible for the adjustment control unit 423 to control the apparatus so as to execute the adjustment process on a command from the console unit 422.

It would be permissible for the CPU 412 to transfer the data that is obtained by way of the periodic adjustment process to an external host computer, via a network. Doing so would allow the operator to ascertain the property of each respective configuration unit, such as the exposure device 113, the photosensitive drum 101, and the developing device 103. The information thereof would allow the image forming apparatus 100 to monitor a schedule for a replacement of each respective configuration unit in the apparatus according to a useful lifespan thereof, and to motivate the operator to carry out the replacement of each respective configuration unit prior to a fault occurring therewith. As a result, the image forming apparatus 100 according to the embodiment is capable of forecasting the useful lifespan of such as a consumable thereof, which has an effect of being usable until the image forming apparatus 100 wears out altogether.

FIG. 19 illustrates a result when the adjustment process is executed with regard to the image forming apparatus according to the fourth embodiment. It is to be understood that a test trial 4-1 through 4-3 was performed by using the image forming apparatus 100 in a state of executing the periodic adjustment process. A description of the adjustment process is similar to the description of the adjustment process according to the third embodiment. As a result, the time required for the analysis is significantly reduced, i.e., approximately 50 percent, compared with the time required for the analysis according to the third embodiment.

The present invention is capable of providing an image forming apparatus that forms a particular shape image that configures an image, such as a two-dimensional bar code, with a high degree of precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-146095 filed on May 31, 2007, which is hereby incorporated by reference herein in its entirety.

What is claimed is:

1. An image forming apparatus for forming a two-dimensional bar code, the image forming apparatus comprising:

a storage unit configured to store a plurality of types of particular shape images, each of the particular shape images configuring the two-dimensional bar code;

an image forming unit configured to form a measurement pattern image for measurement, which includes one or more of the particular shape images, upon an image carrier, as a developing material image;

a pattern reading unit configured to read the measurement pattern image that is formed upon the image carrier;

a first determination unit configured to determine a difference between a shape of the particular shape image that is included in the measurement pattern image that is read with the pattern reading unit, and a shape of the particular shape image that is stored in the storage unit; and a second determination unit configured to determine an image forming condition with regard to the particular shape image stored in the storage unit, in accordance with the difference that is determined by the first determination unit.

2. The image forming apparatus according to claim 1, further comprising:

an adjustment unit configured to adjust the image forming condition for a pixel included in the particular shape image, the difference of which is determined, among a plurality of pixels that configures the particular shape image, in accordance with the image forming condition that is determined by the second determination unit.

3. The image forming apparatus according to claim 2, wherein the image forming unit comprises an exposure unit configured to expose the image carrier to an image; and the adjustment unit adjusts, with respect to a pixel to be adjusted, at least one of a quantity and a diameter of an exposure spot required for rendering a single pixel.

4. The image forming apparatus according to claim 3, further comprising:

a correction unit configured to correct image data of the two-dimensional bar code, when forming the two-dimensional bar code, according to at least one of the quantity and the diameter of the exposure spot that is adjusted by the adjustment unit.

5. The image forming apparatus according to claim 4, wherein the first determination unit comprises an identification unit configured to identify the type of the particular shape image about which it is determined that the difference is present; and the correction unit corrects a particular shape image that matches a shape of the particular shape image that is identified by the identification unit, among the plurality of types of the particular shape image that is included in the two-dimensional bar code.

6. The image forming apparatus according to claim 4, further comprising:

a bar code reading unit configured to read the two-dimensional bar code from a recording material on which the two-dimensional bar code is formed; and a shape detection unit configured to detect a type of the particular shape image that is included in the image data of the two-dimensional bar code that is read by the bar code reading unit, and a location of the particular shape image with regard to the two-dimensional bar code that is read by the bar code reading unit, wherein the correction unit identifies a pixel that is to be corrected in the particular shape image about which it is determined that the difference is present, in accordance with the type and the location of the particular shape image that is detected by the shape detection unit, and corrects the image data of the two-dimensional bar code according to the identified pixel.

7. The image forming apparatus according to claim 2, further comprising:

a third determination unit configured to compare the measurement pattern image that is read by the pattern reading unit with a measurement pattern image that is derived from the particular shape image that is stored in the storage unit, and to determine a difference in a location and an area of the formed measurement pattern image, wherein the adjustment unit adjusts a location at which an electrostatic latent image is formed upon the image carrier by the image forming unit in accordance with the difference of the location of the measurement pattern image, and the adjustment unit adjusts a light amount of an exposure on the image carrier in order to form the electrostatic latent image, in accordance with the difference of the area of the measurement pattern image.

8. The image forming apparatus according to claim 7, further comprising:

an intermediate transfer member configured to receive a developing material image formed upon the image carrier and transferred thereto, wherein the first determination unit and the third determination unit respectively perform their determining operations by means of at least one of the measurement pattern image that is formed upon the image carrier and the measurement pattern image that is formed upon the intermediate transfer member.

9. The image forming apparatus according to claim 2, wherein the adjustment unit performs either a thinning process or a thickening process of the image data.

10. The image forming apparatus according to claim 1, wherein the particular shape image is an image that comprises a polygonal shape that is configured by a first pixel array, and a second pixel array that intersects the first pixel array at right angles.

11. The image forming apparatus according to claim 10; wherein the particular shape image has an L shape, a convex shape, or a cross shape.

12. A control method of an image forming apparatus for forming a two-dimensional bar code, the control method comprising the steps of:

storing a plurality of types of particular shape images, each of the particular shape images configuring the two-dimensional bar code, in a storage unit;

forming a measurement pattern image for measurement, which includes one or more of the particular shape images, upon an image carrier, as a developing material image;

reading the measurement pattern image that is formed upon the image carrier;

determining a difference between a shape of the particular shape image that is included in the measurement pattern image that is read in the pattern reading step, and a shape of the particular shape image that is stored in the storage unit; and determining an image forming condition with regard to the particular shape image stored in the storage unit, in accordance with the difference that is determined in the first determination step.

* * * * *